United States Patent
Kim et al.

(10) Patent No.: US 10,728,078 B2
(45) Date of Patent: Jul. 28, 2020

(54) METHOD AND USER EQUIPMENT FOR RECEIVING DOWNLINK SIGNAL, AND METHOD AND BASE STATION FOR TRANSMITTING DOWNLINK SIGNAL

(71) Applicant: LG ELECTRONICS INC., Seoul (KR)

(72) Inventors: Eunsun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/766,783

(22) PCT Filed: Oct. 17, 2016

(86) PCT No.: PCT/KR2016/011636
§ 371 (c)(1),
(2) Date: Apr. 6, 2018

(87) PCT Pub. No.: WO2017/069474
PCT Pub. Date: Apr. 27, 2017

(65) Prior Publication Data
US 2018/0287846 A1    Oct. 4, 2018

Related U.S. Application Data

(60) Provisional application No. 62/243,644, filed on Oct. 19, 2015, provisional application No. 62/335,644, filed on May 12, 2016.

(51) Int. Cl.
*H04J 11/00* (2006.01)
*H04L 27/26* (2006.01)
(Continued)

(52) U.S. Cl.
CPC ...... *H04L 27/2666* (2013.01); *H04J 11/0073* (2013.01); *H04L 5/001* (2013.01);
(Continued)

(58) Field of Classification Search
CPC ... H04L 27/2655; H04L 5/001; H04L 5/0053; H04L 27/2662; H04L 5/003;
(Continued)

(56) References Cited

U.S. PATENT DOCUMENTS

2009/0316659 A1    12/2009    Lindoff et al.
2012/0269119 A1    10/2012    Cheng et al.
(Continued)

FOREIGN PATENT DOCUMENTS

| EP | 3327962 | 5/2018 |
|----|---------|--------|
| JP | 2015522975 | 8/2015 |
| KR | 1020170012150 | 2/2017 |

OTHER PUBLICATIONS

European Patent Office Application Serial No. 16857732.8, Search Report dated Apr. 29, 2019, 10 pages.
(Continued)

*Primary Examiner* — Faruk Hamza
*Assistant Examiner* — Aixa A Guadalupe Cruz
(74) *Attorney, Agent, or Firm* — Lee Hong Degerman Kang Waimey

(57) ABSTRACT

A method and an apparatus for transmitting/receiving a downlink signal in a wireless communication system are provided. Carrier information about a second carrier that is different from a first carrier can be transmitted on the first carrier. Downlink data for UE can be transmitted on the second carrier based on the carrier information. The first carrier is a carrier having a synchronisation signal and a physical broadcast channel, and the second carrier can be a carrier without any synchronisation signals or physical
(Continued)

broadcast channels. The first carrier can be operated on a single resource block in a guard frequency that is used in the wireless communication system.

8 Claims, 11 Drawing Sheets

(51) Int. Cl.
*H04L 5/00* (2006.01)
*H04W 4/70* (2018.01)
*H04W 72/04* (2009.01)
*H04W 74/08* (2009.01)
*H04J 13/00* (2011.01)
*H04L 1/18* (2006.01)

(52) U.S. Cl.
CPC ............ *H04L 5/005* (2013.01); *H04L 5/0044* (2013.01); *H04L 5/0048* (2013.01); *H04L 5/0053* (2013.01); *H04L 27/2662* (2013.01); *H04W 4/70* (2018.02); *H04W 72/042* (2013.01); *H04W 72/0406* (2013.01); *H04W 74/0808* (2013.01); *H04W 74/0841* (2013.01); *H04J 11/00* (2013.01); *H04J 11/0066* (2013.01); *H04J 13/004* (2013.01); *H04J 2013/0088* (2013.01); *H04J 2013/0096* (2013.01); *H04L 1/1812* (2013.01)

(58) Field of Classification Search
CPC .......... H04L 5/0096; H04L 7/00; H04W 4/70; H04W 56/001; H04W 72/0453; H04W 56/00; H04W 72/042
See application file for complete search history.

(56) References Cited

U.S. PATENT DOCUMENTS

| | | |
|---|---|---|
| 2012/0300725 A1 | 11/2012 | Kwon et al. |
| 2013/0010964 A1 | 1/2013 | Fong et al. |
| 2013/0114566 A1 | 5/2013 | Awoniyi et al. |
| 2013/0170387 A1 | 7/2013 | Wang et al. |
| 2013/0182680 A1 | 7/2013 | Choi et al. |
| 2013/0301524 A1 | 11/2013 | Xu et al. |
| 2014/0177576 A1 | 6/2014 | Lindoff et al. |
| 2014/0211725 A1 | 7/2014 | Damnjanovic et al. |
| 2016/0057684 A1 | 2/2016 | Larsson et al. |
| 2017/0094621 A1* | 3/2017 | Xu ..................... H04W 56/001 |
| 2017/0164400 A1 | 6/2017 | Fong et al. |
| 2018/0035452 A1 | 2/2018 | Yu et al. |
| 2018/0039975 A1 | 2/2018 | Hefetz |
| 2018/0098274 A1 | 4/2018 | Thangarasa et al. |
| 2018/0213468 A1 | 7/2018 | Chatterjee et al. |
| 2018/0227148 A1 | 8/2018 | Chatterjee et al. |
| 2019/0165844 A1 | 5/2019 | Dinan |

OTHER PUBLICATIONS

U.S. Appl. No. 15/765,717, Office Action dated Apr. 4, 2019, 15 pages.
Qualcomm, "Design Principles for NB-IoT Sync Channel", 3GPP TSG RAN WG1 Meeting #82bis, R1-155746, XP051002571, Oct. 2015, 6 pages.
Samsung, et al., "NB-LTE—Inband operation", 3GPP TSG RAN WG Meeting #69, RP-151557, XP051000985, Sep. 2015, 14 pages.
NTT Docomo, "Performance Evaluation of PDSCH for Low Complexity MTC", 3GPP TSG RAN WG1 Meeting #80, R1-150531, Feb. 2015, 5 pages.
PCT International Application No. PCT/KR2016/011607, Written Opinion of the International Searching Authority dated Feb. 9, 2017, 15 pages.
PCT International Application No. PCT/KR2016/011636, Written Opinion of the International Searching Authority dated Jan. 25, 2017, 14 pages.
LG Electronics, "Overview on design of downlink for NB-IoT", 3GPP TSG RAN WG1 Meeting #82bis, R1-155799, Oct. 2015, 6 pages.
Qualcomm, "In-band Design for NB-IOT", 3GPP TSG RAN WG1 Meeting #82bis, R1-155748, Oct. 2015, 6 pages.
Samsung, "Narrowband IOT—Downlink Control/Data Channel Design", 3GPP TSG RAN WG1 Meeting #82bis, R1-155512, Oct. 2015, 7 pages.
Samsung, "Narrowband IoT—Performance Evaluations of Downlink Channels", 3GPP TSG RAN WG1 Meeting #82bis, R1-155516, Oct. 2015, 5 pages.
LG Electronics, "Discussion on inband operation for NB-IoT", 3GPP TSG RAN WG1 Meeting #82bis, R1-155796, Oct. 2015, 2 pages.
U.S. Appl. No. 15/765,717, Notice of Allowance dated Jul. 29, 2019, 10 pages.
Korean Intellectual Property Office Application No. 10-2018-7008858, Notice of Allowance dated Jun. 1, 2020, 10 pages.
LTE; Evolved Universal Terrestrial Radio Access (E-UTRA); Physical channels and modulation (3GPP TS 36.211 version 12.5.0 Release 12). ETSI TS 136 211 v12.5.0, Apr. 2015, 139 pages.
Ericsson et al., "WF on CFI for MTC", 3GPP TSG RAN WG1 Meeting #82bis, R1-156341, Oct. 2015, pages.
Session Chairman (Qualcomm Inc.), "Summary of Ad-hoc session on Further LTE Physical Layer Enhancements for MTC", 3GPP TSG RAN WG1 Meeting #82bis, R1-156362, Oct. 2015, 15 pages.

\* cited by examiner

[P] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

FIG. 12

T902: NB-LTE UE goes to data carrier to receive channels other than nSS/nPBCH
- eNB signals frequency location of data cahnnel (e.g. frequency gap between center of anchor carrier and data carrier),
- set of data carriers can be configured,
- PDSCH rate-matching information of data carrier, and/or
- CP type, frame structure type, TDD UL/DL configuration, PDSCH stating symbols, and etc.

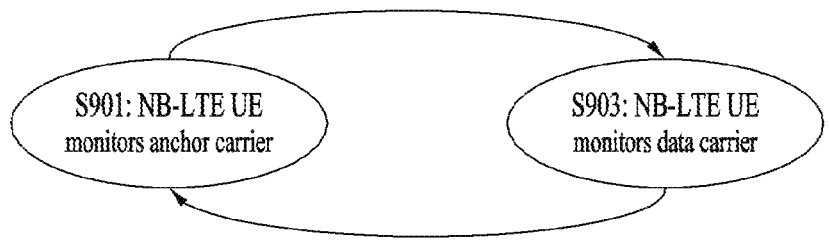

T904: NB-LTE UE goes to anchor carrier to monitor system information or update of it in any of the following conditions:
1. at every predetermined interval (e.g. every nSS/nPBCH transmission instance),
2. at eNB configured time instance (e.g. eNB command),
3. when NB-LTE UE wakes up from discontinuous reception (DRX).

FIG. 13

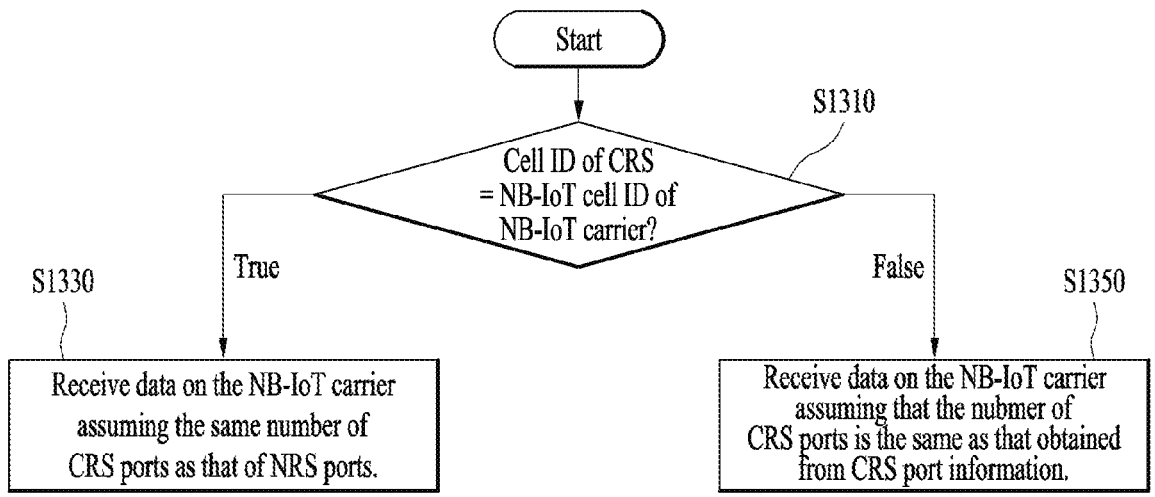

METHOD AND USER EQUIPMENT FOR RECEIVING DOWNLINK SIGNAL, AND METHOD AND BASE STATION FOR TRANSMITTING DOWNLINK SIGNAL

CROSS-REFERENCE TO RELATED APPLICATIONS

This application is the National Stage filing under 35 U.S.C. 371 of International Application No. PCT/KR2016/011636, filed on Oct. 17, 2016, which claims the benefit of U.S. Provisional Application No. 62/243,644, filed on Oct. 19, 2015, and 62/335,644, filed on May 12, 2016, the contents of which are all hereby incorporated by reference herein in their entirety.

TECHNICAL FIELD

The present invention relates to a wireless communication system and, more particularly, to a method for transmitting or receiving downlink control and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solution

Carrier information about a second carrier different from a first carrier may be transmitted on the first carrier. A downlink data for the user equipment may be transmitted on the second carrier based on the carrier information. The first carrier may be a carrier having a synchronization signal and a physical broadcast channel and the second carrier may be a carrier without the synchronization and the physical broadcast channel. The first carrier may operate in one resource block within a guard band used in a wireless communication system.

According to an aspect of the present invention, provided herein is a method of receiving a downlink signal in narrowband Internet of things (NB-IoT) by a user equipment in a wireless communication system. The method may include receiving carrier information about a second carrier different from a first carrier on the first carrier; and receiving downlink data for the user equipment on the second carrier based on the carrier information. The first carrier may operate in one first resource block (RB) within a guard band used in the wireless communication system and the second carrier may operate in one second RB within a channel band used in the wireless communication system. The first carrier may be a carrier on which an NB-IoT synchronization signal (nSS) and an NB-IoT physical broadcast channel (nPBCH) are received and the second carrier may be a carrier on which the nSS and the nPBCH are not received.

According to another aspect of the present invention, provided herein is a method of transmitting a downlink signal in narrowband Internet of things (NB-IoT) to a user equipment by a base station in a wireless communication system. The method may include transmitting carrier information about a second carrier different from a first carrier on the first carrier; and transmitting downlink data for the user equipment on the second carrier based on the carrier information. The first carrier may operate in one first resource block (RB) within a guard band used in the wireless communication system and the second carrier may operate in one second RB within a channel band used in the wireless communication system. The first carrier may be a carrier on which an NB-IoT synchronization signal (nSS) and an NB-IoT physical broadcast channel (nPBCH) are transmitted and the second carrier may be a carrier on which the nSS and the nPBCH are not transmitted.

According to another aspect of the present invention, provided herein is a user equipment for receiving a downlink signal in narrowband Internet of things (NB-IoT) in a wireless communication system. The user equipment may include a radio frequency (RF) unit, and a processor configured to control the RF unit. The processor may be configured to control the RF unit to receive carrier information about a second carrier different from a first carrier on the first carrier. The processor may be configured to control the RF unit to receive downlink data for the user equipment on the second carrier based on the carrier information. The first carrier may operate in one first resource block (RB) within a guard band used in the wireless communication system and the second carrier may operate in one second RB within a channel band used in the wireless communication system. The first carrier may be a carrier on which an NB-IoT synchronization signal (nSS) and an NB-IoT physical broadcast channel (nPBCH) are received and the second carrier may be a carrier on which the nSS and the nPBCH are not received.

According to another aspect of the present invention, provided herein is a base station for transmitting a downlink signal in narrowband Internet of things (NB-IoT) to a user equipment by a base station in a wireless communication system. The base station may include a radio frequency (RF) unit, and a processor configured to control the RF unit. The processor may be configured to control the RF unit to transmit carrier information about a second carrier different from a first carrier on the first carrier. The processor may be configured to control the RF unit to transmit downlink data for the user equipment on the second carrier based on the carrier information. The first carrier may operate in one first resource block (RB) within a guard band used in the wireless communication system and the second carrier operates in one second RB within a channel band used in the wireless communication system. The first carrier may be a carrier on which an NB-IoT synchronization signal (nSS) and an NB-IoT physical broadcast channel (nPBCH) are transmitted and the second carrier may be a carrier on which the nSS and the nPBCH are not transmitted.

In each aspect of the present invention, the wireless communication system may be a long term evolution (LTE) system.

In each aspect of the present invention, the carrier information may include at least one of information about the number of antenna ports for a cell-specific reference signal on the second carrier and information about a cell identifier applied to the cell-specific reference signal.

In each aspect of the present invention, the second carrier may include a downlink carrier and an uplink carrier. The carrier information may include information about the downlink carrier and the uplink carrier.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

According to an embodiment of the present invention, a low-complexity/low-cost UE can communicate with a BS while maintaining compatibility with a legacy system.

According to an embodiment of the present invention, a UE can be implemented with low complexity/low cost.

According to an embodiment of the present invention, a UE and an eNB can communicate in a narrowband.

According to an embodiment of the present invention, small amounts of data can be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 12 is a diagram illustrating a status and transition for a UE according to the present invention.

FIG. 13 illustrates a relationship between a (legacy) CRS and an in-band IoT carrier according to the present invention.

MODE FOR INVENTION

Figure 1:
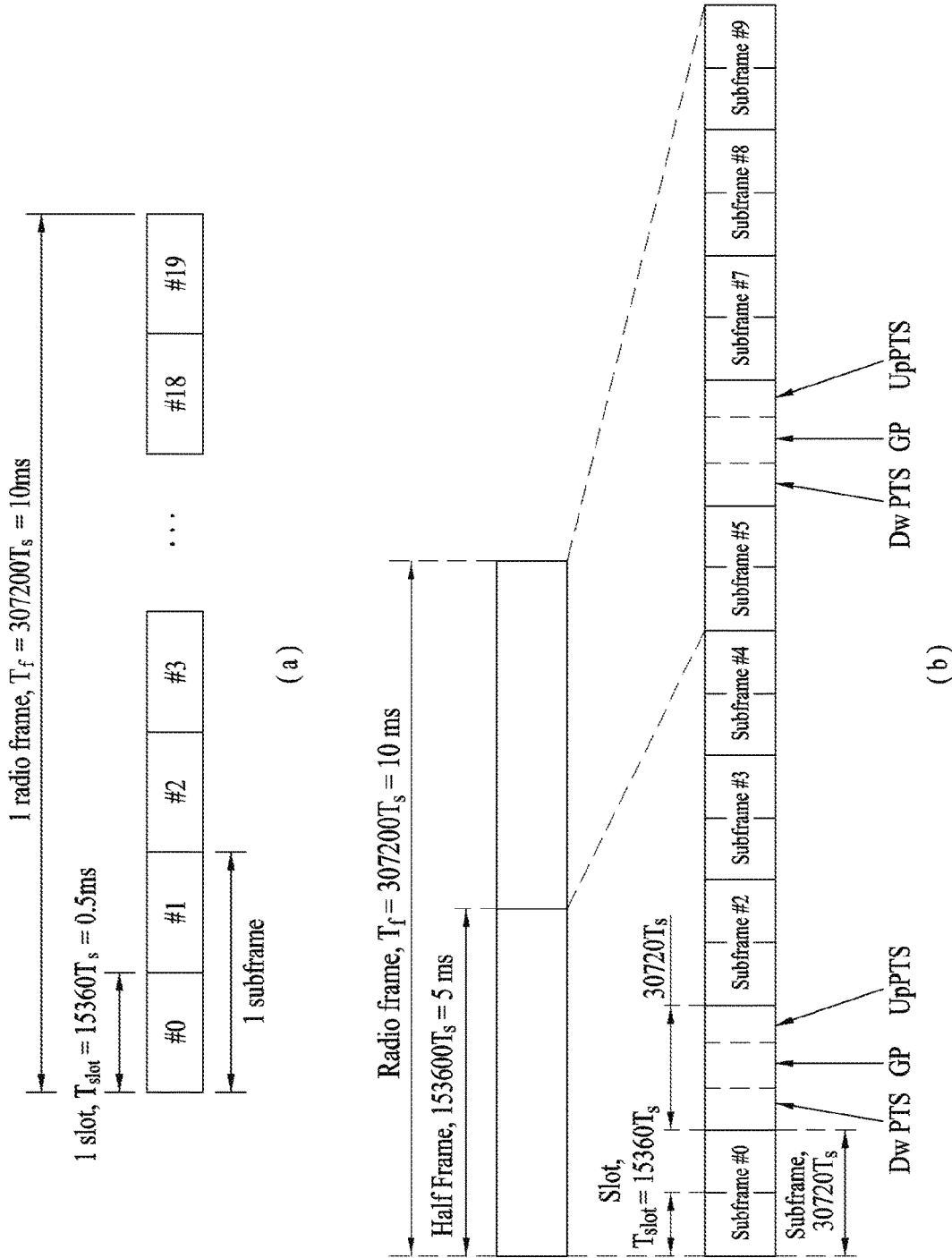
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmitting device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmitting devices always sense carrier of a network and, if the network is empty, the transmitting devices wait for determined time according to locations thereof registered in a list and then transmit data. Various methods are used to determine priority of the transmitting devices in the list and to reconfigure priority. In a system according to some versions of IEEE 802.11 standards, collision may occur and, in this case, a collision sensing procedure is performed. A transmitting device using CSMA/CA avoids collision between data transmission thereof and data transmission of another transmitting device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For a detailed CSI-RS configuration, refer to documents such as 3GPP TS 36.211 and 3GPP TS 36.331.

Meanwhile, a 3GPP LTE/LTE-A system uses the concept of a cell to manage a radio resource. A cell associated with the radio resource is different from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

For terms and technologies which are not described in detail in the present invention, reference can be made to standard documents of 3GPP LTE/LTE-A, for example, 3GPP TS 36.211, 3GPP TS 36.212, 3GPP TS 36.213, 3GPP TS 36.321, and 3GPP TS 36.331.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in down | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
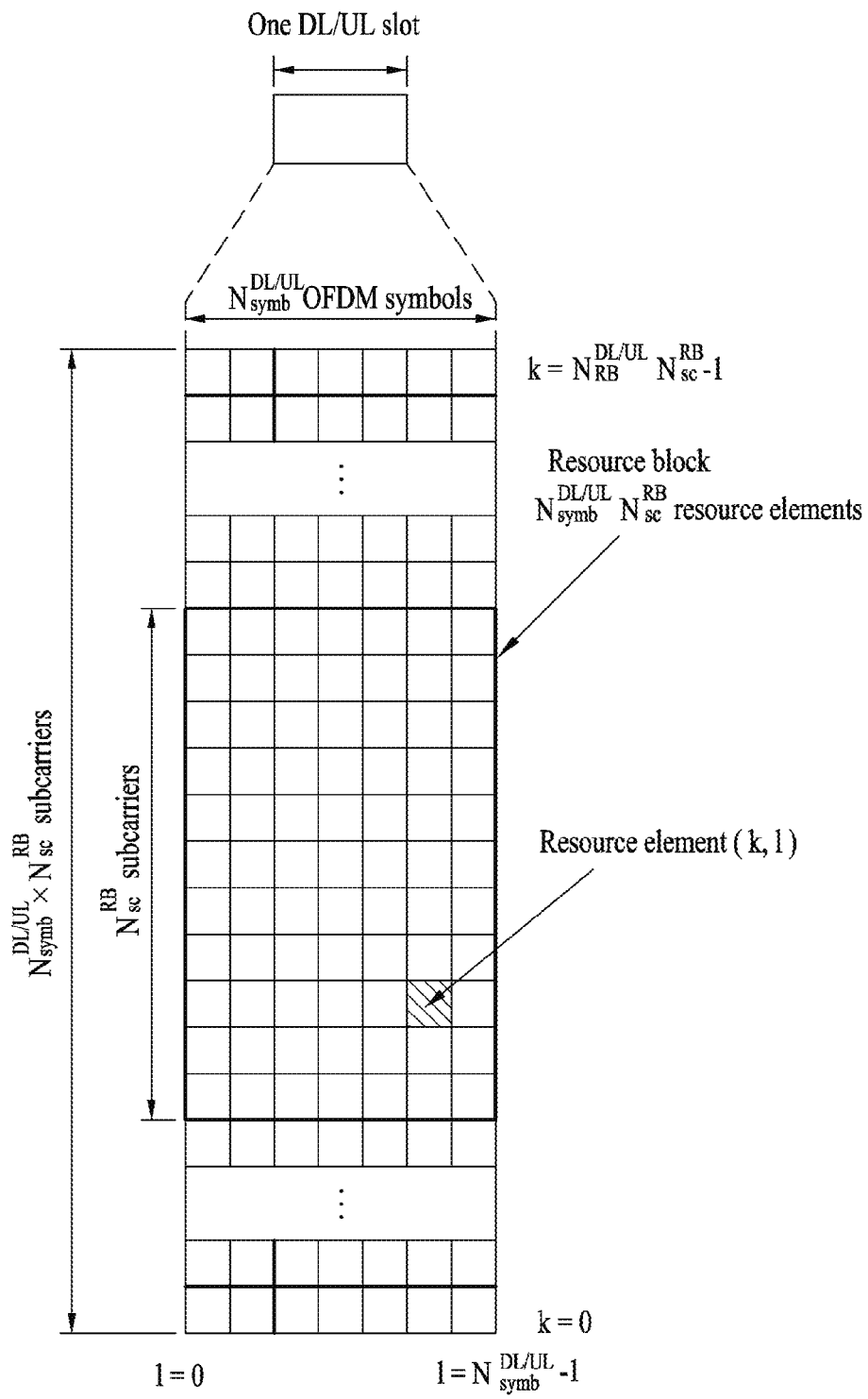
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
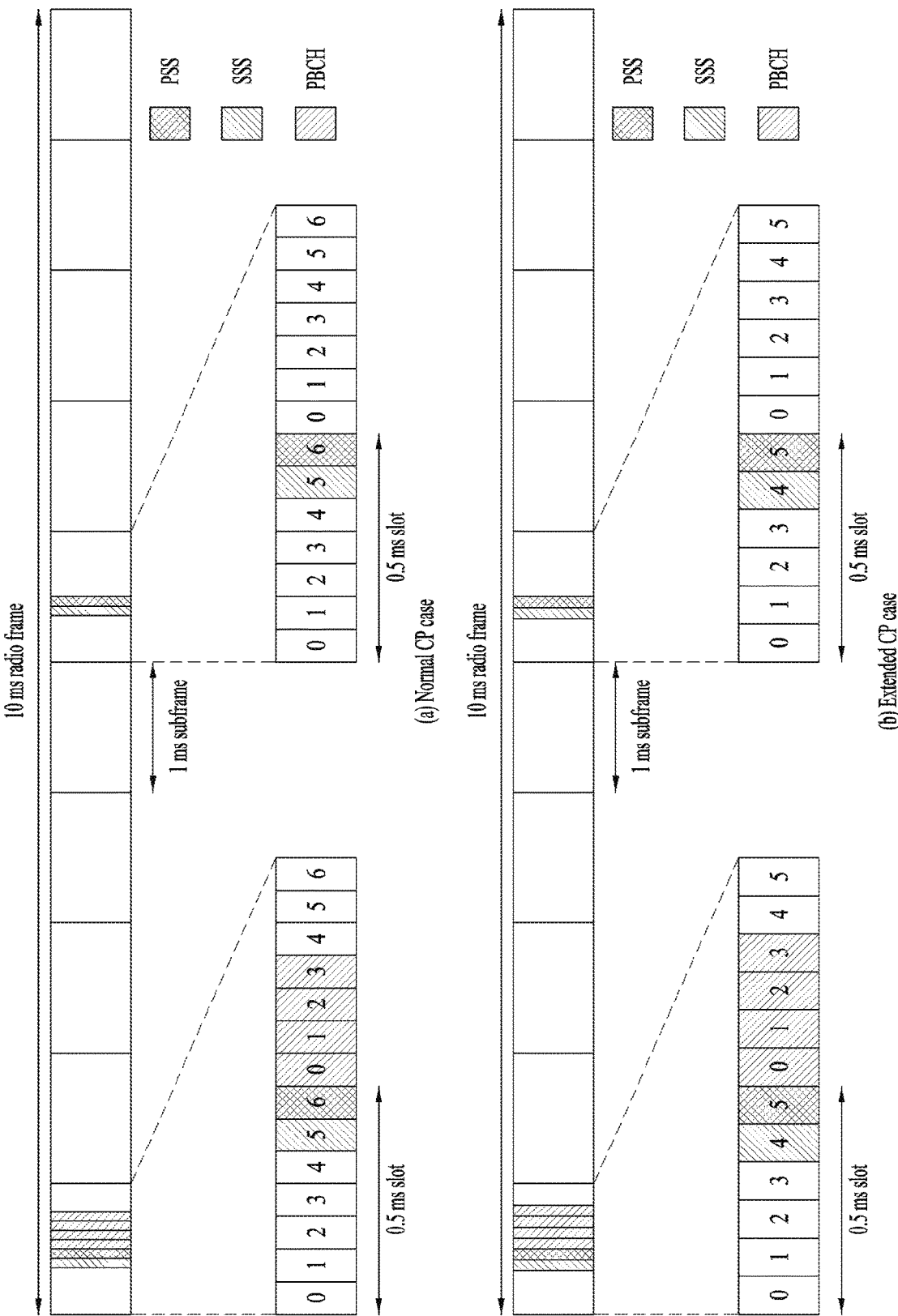
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(*a*) illustrates transmission locations of an SS and a PBCH in a radio frame configured as a normal cyclic prefix (CP) and FIG. 3(*b*) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and may be categorized into an MIB, SIB Type 1 (SIB1), SIB Type 2 (SIB2), and SIB3 to SIB17 according to included parameters.

The MIB includes most frequency transmitted parameters which are essential for initial access of the UE to a network of the eNB. The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

SIB1 includes not only information about time-domain scheduling of other SIBs but also parameters needed to determine whether a specific cell is suitable for cell selection. SIB1 is received by the UE through broadcast signaling or dedicated signaling.

A DL carrier frequency and a system BW corresponding to the DL carrier frequency may be acquired by the MIB that the PBCH carries. A UL carrier frequency and a system BW corresponding to the UL carrier frequency may be acquired through system information which is a DL signal. If no stored valid system information about a corresponding cell is present as a result of receiving the MIB, the UE applies a DL BW in the MIB to a UL BW until SIB2 is received. For example, the UE may recognize an entire UL system BW which is usable for UL transmission thereby through UL-carrier frequency and UL-BW information in SIB2 by acquiring SIB2.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDCCH/PDSCH reception and PUSCH/PUCCH transmission as general uplink/downlink transmission procedures.

The random access procedure is also referred to as a random access channel (RACH) procedure. The random access procedure is used for various purposes including initial access, adjustment of UL synchronization, resource assignment, and handover. Random access procedures are categorized into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible for multiple UEs to transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without collision with other UEs.

The contention-based random access procedure includes the following four steps. Messages transmitted in Steps 1 to 4 given below may be referred to as Msg1 to Msg4.
  Step 1: RACH preamble (via PRACH) (from UE to eNB)
  Step 2: Random access response (RAR) (via PDCCH and PDSCH) (from eNB to UE)
  Step 3: Layer 2/layer 3 message (via PUSCH) (from UE to eNB)
  Step 4: Contention resolution message (from eNB to UE)

The dedicated random access procedure includes the following three steps. Messages transmitted in Steps 0 to 2 may be referred to as Msg0 to Msg2, respectively. Uplink transmission (i.e., Step 3) corresponding to the RAR may also be performed as a part of the random access procedure. The dedicated random access procedure may be triggered using a PDCCH for ordering transmission of an RACH preamble (hereinafter, a PDCCH order).
  Step 0: RACH preamble assignment (from eNB to UE) through dedicated signaling
  Step 1: RACH preamble (via PRACH) (from UE to eNB)
  Step 2: RAR (via PDCCH and PDSCH) (from eNB to UE)

After transmitting the RACH preamble, the UE attempts to receive an RAR within a preset time window. Specifically, the UE attempts to detect a PDCCH with RA-RNTI (Random Access RNTI) (hereinafter, RA-RNTI PDCCH) (e.g., CRC is masked with RA-RNTI on the PDCCH) in the time window. In detecting the RA-RNTI PDCCH, the UE checks the PDSCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

Figure 4:
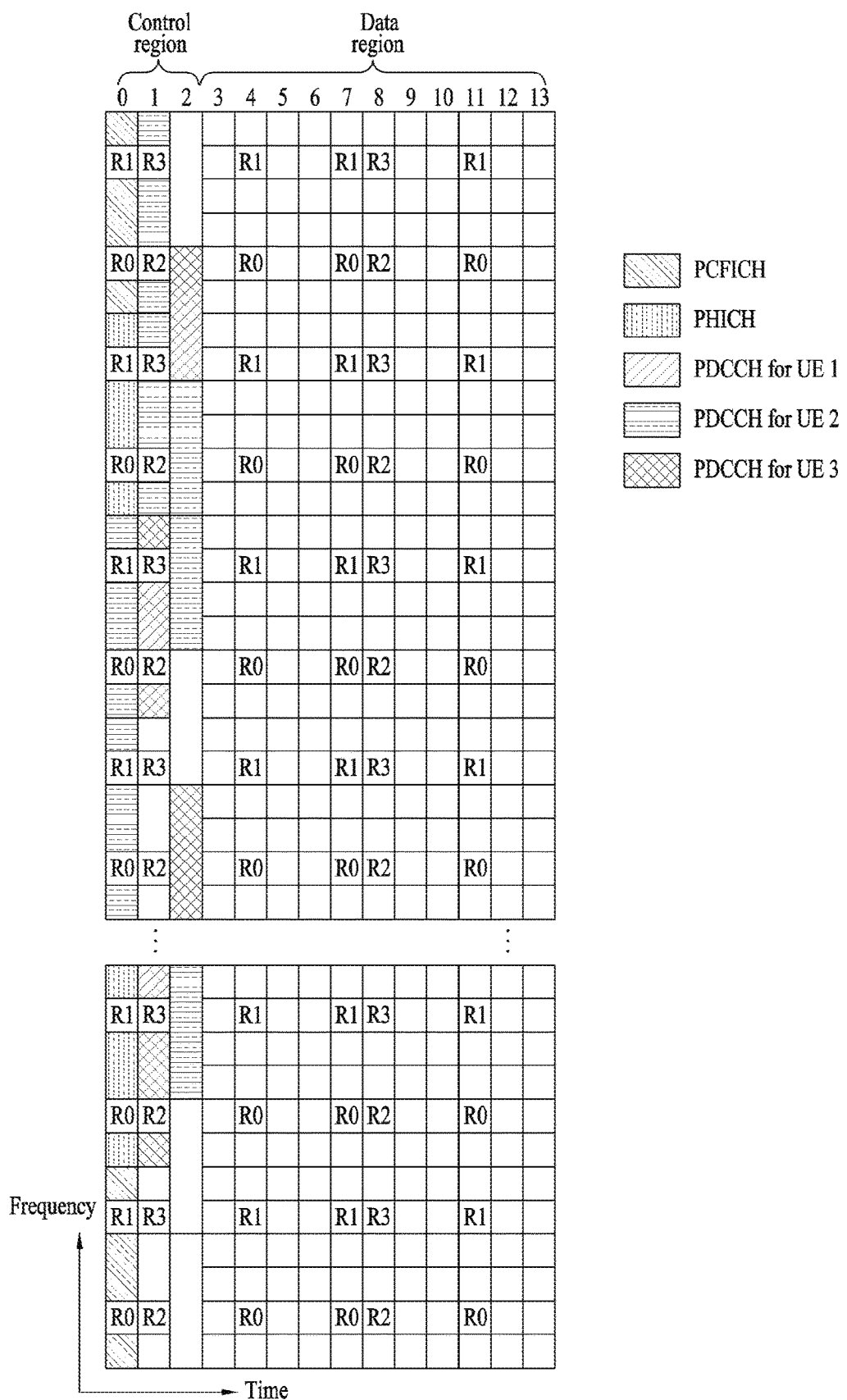
FIG. 4 illustrates the structure of a DL subframe used in a wireless communication system.

FIG. 4 illustrates the structure of a DL subframe used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |

TABLE 3-continued

| Subframe | Number of OFDM symbols for PDCCH when $N^{DL}_{RB} > 10$ | Number of OFDM symbols for PDCCH when $N^{DL}_{RB} \leq 10$ |
|---|---|---|
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the PDCCH is given by the CFI. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread with a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

Generally, a DCI format, which may be transmitted to the UE, is varied depending on a transmission mode configured for the UE. In other words, certain DCI format(s) corresponding to the specific transmission mode not all DCI formats may only be used for the UE configured to a specific transmission mode.

For example, a transmission mode is semi-statically configured for the UE by a higher layer so that the UE may receive a PDSCH transmitted in accordance with one of a plurality of transmission modes which are previously defined. The UE attempts to decode a PDCCH using DCI formats only corresponding to its transmission mode. In other words, in order to maintain UE operation load according to blind decoding attempt, at a certain level or less, all DCI formats are not searched by the UE at the same time.

Table 5 illustrates transmission modes for configuring multi-antenna technology and DCI formats for allowing a UE to perform blind decoding at the corresponding transmission mode. Particularly, Table 5 illustrates a relation between PDCCH and PDSCH configured by C-RNTI (Cell RNTI(Radio Network Temporary Identifier)).

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 or single-antenna port, port 7 or 8 |
| Mode 10 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2D | UE specific by C-RNTI | Up to 8 layer transmission, ports 7-14 or single antenna port, port 7 or 8 |

Although transmission modes 1 to 10 are listed in Table 5, other transmission modes in addition to the transmission modes defined in Table 5 may be defined.

The PDCCH is allocated to first m number of OFDM symbol(s) within a subframe. In this case, m is an integer equal to or greater than 1, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A DCI format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A set of CCEs on which the UE can discover a PDCCH thereof is referred to as a PDCCH search space or simply as a search space. An individual resource on which the PDCCH can be transmitted in the search space is called a PDCCH candidate. A set of PDCCH candidates that the UE is to monitor is defined as a search space. Herein, a search space $S^{(L)}_k$ in an aggregation level $L \in \{1,2,4,8\}$ is defined by a set of candidates of the PDCCH. A search space may have a different size and a dedicated search space and a common search space are defined. The dedicated search space is a UE-specific search space (USS) and is configured for each individual UE. The common search space (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Figure 5:
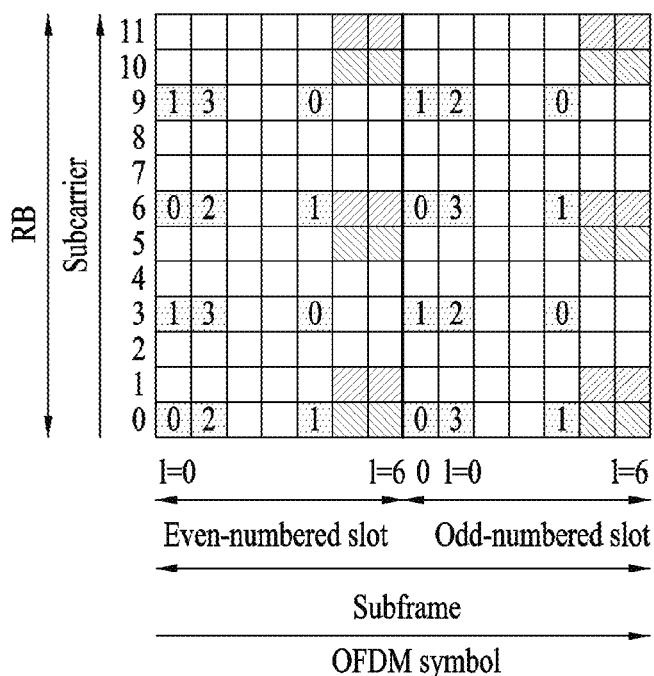
FIG. 5 illustrates a cell-specific reference signal (CRS) and a UE-specific reference signal (UE-RS).

FIG. 5 illustrates a configuration of CRSs and UE-RSs. In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

Referring to FIG. 5, a CRS is transmitted through antenna port p=0, p=0,1, or p=0,1,2,3 according to the number of antenna ports of a transmission node. The CRS is fixed to a predetermined pattern in a subframe regardless of a control region and a data region. A control channel is allocated to a resource on which the CRS is not allocated in the control region and a data channel is allocated to a resource on which the CRS is not allocated in the data region.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-RS and a CSI-RS are further defined in addition to a CRS. The UE-RS is used for demodulation and the CSI-RS is used to derive CSI. The UE-RS is one type of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

Referring to FIG. 5, UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

In the 3GPP LTE-A system, the UE-RSs are defined in a PRB pair. Referring to FIG. 5, in a PRB having frequency-domain index $n_{PRB}$ assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{Equation 1}$$

where $w_p(i)$, l', m' are given as follows.

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases} \quad \text{Equation 2}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6 or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in a special subframe with configuration 1, 2, 6, or 7 (see Table 2)} \\ 2, 3 & \text{if } n_s \bmod 2 = 1 \text{ and not in a special subframe with configuration 1, 2, 6 or 7 (see Table 2)} \end{cases}$$

$$m' = 0, 1, 2$$

Herein, $n_s$ is a slot number in a radio frame, which is one of the integers of 0 to 19. The sequence $\overline{w}_p(i)$ for normal CP is given according to the following equation.

TABLE 6

| Antenna port p | [$\overline{w}_p(0)$ $\overline{w}_p(1)$ $\overline{w}_p(2)$ $\overline{w}_p(3)$] |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{Equation 3}$$

-continued $$m = \begin{cases} 0, 1, \ldots, 12N_{RB}^{maxDL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where n=0, 1, . . . , $M_{PN}$−1, is defined by the following equation.

$$c(n)=(x_1(n+N_C)+x_2(n+N_C)) \mod 2$$

$$x_1(n+31)=(x_1(n+3)+x_1(n)) \mod 2$$

$$x_2(n+31)=(x_2(n+3)+x_2(n+2)+x_2(n+1)+x_2(n)) \mod 2 \quad \text{Equation 4}$$

where $N_C$=1600 and the first m-sequence is initialized with $x_1(0)$=1, $x_1(n)$=0, n=1, 2, . . . , 30. The initialization of the second m-sequence is denoted by $c_{init}=\Sigma_{i=0}^{30} x_2(i) \cdot 2^i$ with the value depending on the application of the sequence.

In Equation 3, the pseudo-random sequence generator for generating c(i) is initialized with $c_{init}$ at the start of each subframe according to the following equation.

$$c_{init}=(\lfloor n_s/2 \rfloor+1)\cdot(2n_{ID}^{(nSCID)}+1)\cdot 2^{16}+n_{SCID} \quad \text{Equation 5}$$

In Equation 5, the quantities $n^{(i)}_{ID}$, i=0,1, which is corresponding to $n_{ID}^{(nSCID)}$, is given by a physical layer cell identifier $N^{cell}_{ID}$ if no value for $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 5, the value of $n_{SCID}$ is zero unless specified otherwise. For a PDSCH transmission on antenna ports 7 or 8, $n_{SCID}$ is given by the DCI format 2B or 2D. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

An RS sequence $r_{l,ns}(m)$ for a CRS is defined as follows.

$$r_{l,n_s}(m) = \frac{1}{\sqrt{2}}(1-2\cdot c(2m)) + j\frac{1}{\sqrt{2}}(1-2\cdot c(2m+1)), \quad \text{Equation 6}$$

$$m = 0, 1, \ldots, 2N_{RB}^{max,DL} - 1$$

Herein, $N^{max,DL}_{RB}$ denotes the largest DL bandwidth configuration, represented as a multiple of $N^{RB}_{sc} \cdot n_s$ denotes a slot number in a radio frame and l denotes an OFDM symbol number in a slot. A pseudo-random sequence c(i) is defined by Equation 4. A pseudo-random sequence generator is initialized according to the following equation at the start of each OFDM symbol.

$$c_{init}=2^{10}\cdot(7\cdot(n_s+1)+l+1)\cdot(2\cdot N_{ID}^{cell}+1)+2\cdot N_{ID}^{cell}+N_{CP} \quad \text{Equation 7}$$

Herein, $N^{cell}_{ID}$ denotes a physical layer cell identifier. $N_{CP}$=1 for a normal CP and $N_{CP}$=0 for an extended CP.

Figure 6:
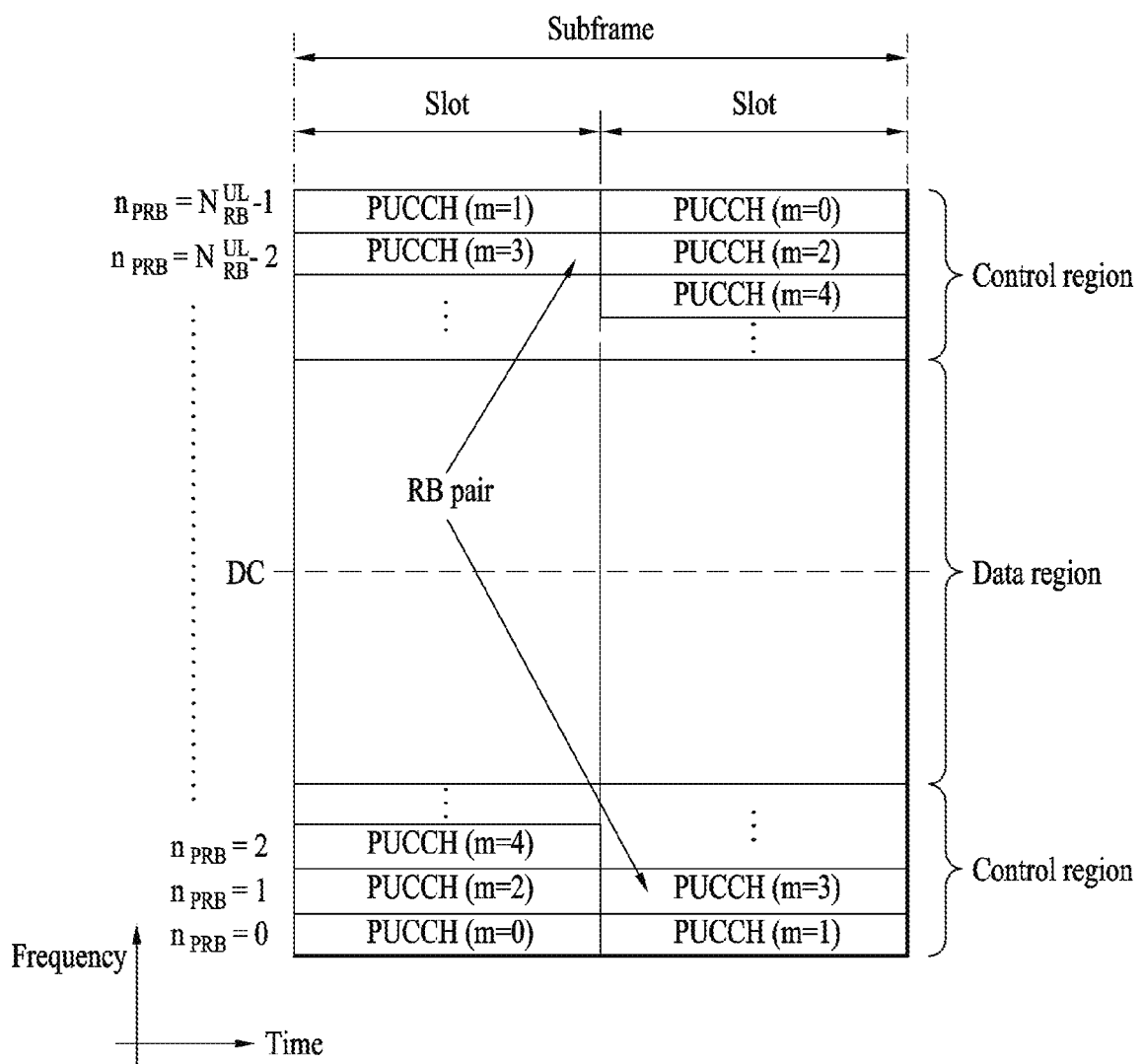
FIG. 6 illustrates the structure of a UL subframe used in a wireless communication system.

In a 3GPP LTE system, a CRS is defined in a PRB pair. Referring to FIG. 6, an RS sequence $r_{l,ns}(m)$ for a CRS is mapped to complex modulation symbols $a^{(p)}_{k,l}$ used as reference symbols for an antenna port p in a slot $n_s$.

$$a_{k,l}^{(p)}=r_{l,n_s}(m') \quad \text{Equation 8}$$

Herein, k, l, and m' are defined as follows.

$$k = 6m + (v + v_{shift}) \mod 6 \quad \text{Equation 9}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2\cdot N_{RB}^{DL} - 1$$

$$m' = m + N_{RB}^{max,DL} - N_{RB}^{DL}$$

Parameters v and $v_{shift}$ define locations for different RSs in the frequency domain and v is given by the following equation.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \mod 2) & \text{if } p = 2 \\ 3+3(n_s \mod 2) & \text{if } p = 3 \end{cases} \quad \text{Equation 10}$$

A cell-specific frequency shift is given by $v_{shift}=N^{cell}_{ID}$ mod 6, wherein $N^{cell}_{ID}$ is a physical layer cell identifier, i.e., a physical cell identifier.

FIG. 6 illustrates the structure of a UL subframe used in a wireless communication system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC).

For example, three 20 MHz CCs in each of UL and DL are aggregated to support a BW of 60 MHz. The CCs may be contiguous or non-contiguous in the frequency domain. Although a case that a BW of UL CC and a BW of DL CC are the same and are symmetrical is described, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

A configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell.

For reference, a carrier indicator (CI) means a serving cell index ServCellIndex and CI=0 is applied to a Pcell. The serving cell index is a short identity used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, if RRH technology, cross-carrier scheduling technology, etc. are introduced, the amount of PDCCH which should be transmitted by the eNB is gradually increased. However, since a size of a control region within which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured within rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE decodes/demodulates the PDCCH based on the CRS and decodes/demodulates the EPDCCH based on the DMRS. The DMRS associated with EPDCCH is transmitted on the same antenna port p∈{107,108,109,110} as the associated EPDCCH physical resource, is present for EPDCCH demodulation only if the EPDCCH transmission is associated with the corresponding antenna port, and is transmitted only on the PRB(s) upon which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and/or the PDSCH may be transmitted to the MTC UE having the coverage issue through multiple (e.g., about 100) subframes.

Figure 7:
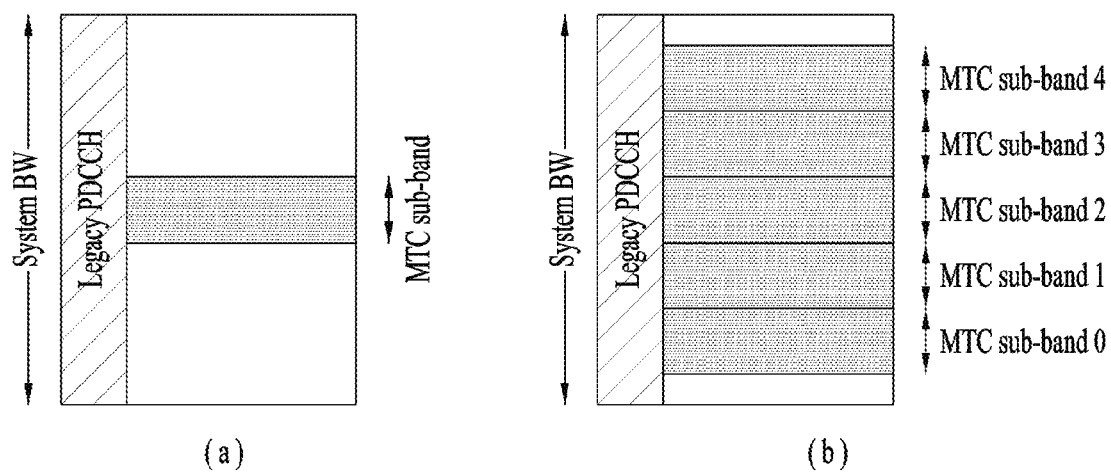
FIG. 7 illustrates an exemplary signal band for MTC.

FIG. 7 illustrates an exemplary signal band for MTC.

As one method of reducing the cost of an MTC UE, the MTC UE may operate in, for example, a reduced DL and UL bandwidths of 1.4 MHz regardless of the system bandwidth when the cell operates. In this case, a sub-band (i.e., narrowband) in which the MTC UE operates may always be positioned at the center of a cell (e.g., 6 center PRBs) as shown in FIG. 7(a), or multiple sub-bands for MTC may be provided in one subframe to multiplex MTC UEs in the subframe such that the UEs use different sub-bands or use the same sub-band which is not a sub-band consisting of the 6 center PRBs as shown in FIG. 7(b).

In this case, the MTC UE may not normally receive a legacy PDCCH transmitted through the entire system bandwidth, and therefore it may not be preferable to transmit a PDCCH for the MTC UE in an OFDM symbol region in which the legacy PDCCH is transmitted, due to an issue of multiplexing with a PDCCH transmitted for another UE. As one method to address this issue, introduction of a control channel transmitted in a sub-band in which MTC operates for the MTC UE is needed. As a DL control channel for such low-complexity MTC UE, a legacy EPDCCH may be used. Alternatively, an M-PDCCH, which is a variant of the legacy EPDCCH, may be introduced for the MTC UE.

A data channel (e.g., a PDSCH or a PUSCH) and/or a control channel (e.g., an M-PDCCH, a PUCCH, or a PHICH) may be transmitted repeatedly through multiple subframes or may be transmitted using a TTI bundling scheme, for coverage enhancement (CE) of a UE. Additionally, for CE, the control/data channel may be transmitted using a scheme such as cross-subframe channel estimation or frequency (narrowband) hopping. Herein, cross-subframe channel estimation refers to a channel estimation method using not only an RS in a subframe in which a corresponding channel is present but also an RS in neighboring subframe(s).

An MTC UE may require CE up to, for example, 15 dB. However, all MTC UEs are not always under an environment requiring CE, nor are requirements for quality of service (QoS) of all MTC UEs the same. For example, devices such as a sensor and a meter have limited mobility and a small amount of data transmission and reception and have a high possibility of being located in a shadow area, thereby requiring high CE. However, wearable devices such as a smartwatch etc. may have greater mobility and a relatively large amount of data transmission and reception and have a high possibility of being located in a non-shadow area. Therefore, all MTC UEs do not necessarily require CE of a high level and demanded capabilities of CE may differ according to types of MTC UEs.

In embodiments of the present invention, which will be described below, "assumes" may mean that an entity transmitting a channel transmits the channel to match a corresponding "assumption" or that an entity receiving the channel receives or decodes the channel in the form of matching the "assumption" on the premise that the channel has been transmitted to match the "assumption".

An LTE cell operates in a bandwidth of a minimum of 6 RBs. To further lower the cost of the MTC UE, an environment in which the MTC operates through a narrow bandwidth of about 200 kHz may be considered. Such an MTC UE, i.e., the MTC UE capable of operating only within the narrow bandwidth, may also operate backward-compatibly in a legacy cell having a wider bandwidth than 200 kHz. A clean frequency band in which the legacy cell is not present may be deployed only for this MTC UE.

In the present invention, a system operating through a small narrowband of one PRB or so in a legacy cell having a bandwidth wider than 200 kHz is referred to as in-band narrowband (NB) Internet of things (IoT) and a system operating through a small NB of one PRB or so only for the MTC UE in a clean frequency band in which the legacy cell is not present is referred to as stand-alone NB IoT.

IoT refers to internetworking of physical devices, connected devices, smart devices, buildings, and other items embedded with electronics, software, sensors, actuators, and network connectivity, which enables these objects to collect and exchange data. In other words, IoT refers to the network of physical objects, machines, people, and other devices, for enabling connectivity and communication to exchange data for IoT intelligent applications and services. IoT allows objects to be sensed and controlled remotely across existing network infrastructure, thereby creating opportunities for more direct integration of the physical world into the digital world and resulting in improved efficiency, accuracy, and economic benefits. Particularly, IoT using 3GPP technology is called cellular IoT (CIoT).

NB-IoT allows access to network services through E-UTRA with a limited channel bandwidth of 180 kHz. NB-IoT may be considered to be IoT operating in units of one PRB.

Hereinafter, a radio resource of a size of one RB operating as NB-IoT will be referred to as an NB-IoT cell or an NB-LTE cell and a system supporting an NB-IoT cell operating in one RB will be referred to as an NB-IoT system or an NB-LTE system.

In addition, hereinafter, an LTE radio resource on which communication occurs according to an LTE system will be referred to as an LTE cell and a GSM radio resource on which communication occurs according to a GSM system will be referred to as a GSM cell. An in-band NB IoT cell may operate in a bandwidth of 200 kHz (considering a guard band) or a bandwidth of 180 kHz (without considering the guard band), in a system band of an LTE cell.

The present invention proposes a method of providing, by an eNB, a service to an NB device having NB RF capabilities while serving a UE having broadband RF capabilities in a broadband system. Herein, broadband represents a band of a minimum of 1.4 MHz.

The present invention proposes a method of receiving, by an NB device having NB RF capabilities, a service using limited RF capabilities of the NB device while minimizing an effect on broadband UEs in a broadband LTE system.

Hereinafter, a UE supporting NB-IoT according to the present invention will be referred to as an NB-IoT UE or an NB-LTE UE.

A method of separately managing a frequency for initial access and a frequency for data and control channel transmission/reception other than initial access is proposed.

Hereinbelow, proposals of the present invention will be described focusing upon an NB-LTE UE. It should be noted that the proposals of the present invention described below are applicable to UEs operating in a normal small bandwidth (BW) as well as an NB-IoT UE.

In a legacy LTE/LTE-A system, a signal and system information for initial access such as a PSS/SSS/PBCH are transmitted in 6 RBs (e.g., 1.4 MHz), which are positioned in the center of a channel band, regardless of an actual data transmission band of an eNB. After receiving the PSS/SSS/PBCH, a UE may be aware of information such as a UL/DL timing of a corresponding cell, BW, application of FDD or TDD, a system frame number (SFN), CP size (extended CP or normal CP), and a PCFICH. After successfully decoding the received PSS/SSS/PBCH and successfully completing a random access procedure, the UE may determine that the UE has successfully accessed a corresponding cell and then transmit/receive UL/DL data on a desired corresponding cell. Since an NB-LTE UE having NB RF capabilities of 200 kHz is incapable of receiving 6 RBs, the NB-LTE UE cannot even perform initial access in a legacy LTE/LTE-A system. Accordingly, an additional SS and system information need to be transmitted in a band having a BW of one RB corresponding to RF capabilities of the NB-LTE UE. To minimize an effect on the legacy system and provide convenience of operation, the present invention proposes operating a carrier on which an SS and system information for initial access are transmitted (hereinafter, an anchor carrier) and a carrier for an actual data service (hereinafter, a data carrier). The NB-LTE UE may perform initial access through the anchor carrier and receive a data service on the data carrier indicated by the anchor carrier.

Hereinafter, a method of operating an NB-IoT system (also called NB-LTE system) using an NB anchor carrier and an NB data carrier together with an LTE system in an LTE band will be described in more detail. Particularly, an operation scheme of an NB anchor/data carrier on which the NB-IoT system and the LTE system coexist in the LTE band, signaling information that should be transmitted to the LTE-NB UE on a corresponding carrier, and a UE operation will be described in more detail. The NB-LTE system operates in a legacy broadband LTE system band and needs to be designed to coexist with the LTE system in the same band while minimizing an effect on a legacy eNB and a legacy UE.

Upon attempting to perform initial access to the LTE system, the UE first receives an SS that an eNB periodically transmits. In the LTE system, the eNB transmits a PSS/SSS through 6 center RBs (i.e., 1.08 MHz) of a system band. Although the PSS/SSS is transmitted through the 6 RBs, the center frequency of the 6 RBs in which the PSS/SSS is present should be located in a frequency corresponding to a multiple of 100 kHz. The UE performing a cell search searches for an SS of the PSS/SSS of the eNB in center frequencies corresponding to a multiple of 100 kHz in units of 100 kHz. That is, in order to facilitate initial cell search of the UE, the DL center frequency of the LTE system may be located only in multiples of 100 kHz in all available frequency bands. This is referred to as frequency raster or channel raster. If the channel raster of the UE is 100 kHz, the UE attempts to detect an SS in every 100 kHz in a given frequency band. For example, if the channel raster is defined as 100 kHz, the center frequency may be located only in the following frequency.

$$F_c = F_o + m \cdot 100 \text{ kHz} \qquad \text{Equation 11}$$

Herein, m is an integer and $F_c$ is a center frequency. $F_o$ may be a frequency in which a frequency band in which an operation of the LTE system is allowed is started or a reference frequency which is used by the UE when the UE starts to search for the center frequency in the frequency band in which the operation of the LTE system is allowed. Alternatively, $F_o$ may be a middle frequency of the LTE system, i.e., a middle frequency of an EUTRA system. If the channel raster is defined as 100 kHz, the center frequency may be located only in units of 100 kHz. According to Equation 11, the UE performs SS search only in units of every 100 kHz starting from the specific frequency $F_o$ and assumes that a frequency in which an SS of a system can be transmitted is present only in units of 100 kHz starting from $F_o$.

The channel raster of the legacy LTE system is 100 kHz. Accordingly, it may be considered that the channel raster of 100 kHz is maintained even in the NB-LTE system. To minimize an effect on the legacy LTE system, maintaining a subcarrier spacing of 15 kHz used in the legacy LTE system may be considered in the NB-IoT system. Such considerations may be particularly effective when the NB-IoT system operates within a band of the LTE system, i.e., an in-band. In this case, if the NB-IoT system operates in a guard band of the LTE system or a band distant from band(s) used in the LTE system, subcarrier spacings other than 15 kHz may be used to provide a service to more UEs in an NB.

Hereinbelow, a channel having a similar or identical purpose to a channel transmitted in a legacy broadband LTE system will be described by adding "n" in front of the name of a legacy channel in order to distinguish the channel from a channel transmitted in the legacy LTE system. For example, an SS transmitted for the NB-LTE system will be referred to as an nSS. The nSS may be transmitted by dividing the nSS into an nPSS and an nSSS in a similar way to the LTE system or may be transmitted as one nSS without distinguishing between the nPSS and the nSSS. Similarly, in the case of a PBCH which is indispensable for initial cell search, a PBCH transmitted in the NB-LTE system will be referred to as an nPBCH. The transmission purpose and contents of a basic nPSS/nSSS/nPBCH are similar to those in the LTE system.

A transmission band of the nSS in the NB-LTE system is limited by RF capabilities of the NB-LTE UE. That is, the transmission band of the nSS cannot be transmitted in a band wider than a band determined by the RF capabilities of the NB-LTE UE. The nSS should be transmitted in a band equal to or narrower than a band determined by the RF capabilities of the NB-LTE UE so that the NB-LTE UE may necessarily receive the nSS. For convenience of description, proposals of the present invention are described by taking an example in which the RF capabilities of the NB-LTE UE support 200 kHz. However, the described proposals of the present invention are not limited to the NB-LTE system having a BW of 200 kHz.

Since the RF capabilities of the NB-LTE UE support 200 kHz, the nSS also needs to be transmitted within 200 kHz. When taking into account the channel raster of 100 kHz, it is preferred that the center frequency of a band in which the nSS is transmitted is always a multiple of 100 kHz. In consideration of a guard band during transmission of a DL signal, a meaningful duration in which information is transmitted in the NB-LTE system may be 180 kHz. 180 kHz is a frequency band included in one PRB defined in the current LTE system and includes 12 subcarriers when a subcarrier spacing of 15 kHz is considered. Locations at which the nSS can be transmitted are very restricted on the premise that the NB-LTE system coexists with the LTE system and the channel raster of the UE is maintained at 100 kHz.

The following table shows a channel BW supported by the LTE system and the number of RBs, $N_{RB}$, per channel BW. That is, the following table shows a transmission BW configuration $N_{RB}$ in E-UTRA channel BWs.

TABLE 7

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The LTE system supports 1.4, 3, 5, 10, 15, and 20 MHz as shown in Table 7 and each band may be defined as the number of PRBs of a bandwidth of 180 kHz.

The following table shows the size of a band, per channel BW of the LTE system, in which information is actually carried, and the size of a guard band in which information is not actually carried in a corresponding channel BW.

TABLE 8

| Channel bandwidth | Number of RBs | Guard band | Guard band/2 |
|---|---|---|---|
| 1.4 MHz | 6 RBs = 1080 kHz | 320 kHz | 160 kHz |
| 3 MHz | 15 RBs = 2700 kHz | 300 kHz | 150 kHz |
| 5 MHz | 25 RBs = 4500 kHz | 500 kHz | 250 kHz |
| 10 MHz | 50 RBs = 9000 kHz | 1000 kHz | 400 kHz |
| 15 MHz | 75 RBs = 13500 kHz | 1500 kHz | 750 kHz |
| 20 MHz | 100 RBs = 18000 kHz | 2000 kHz | 1000 kHz |

Figure 8:
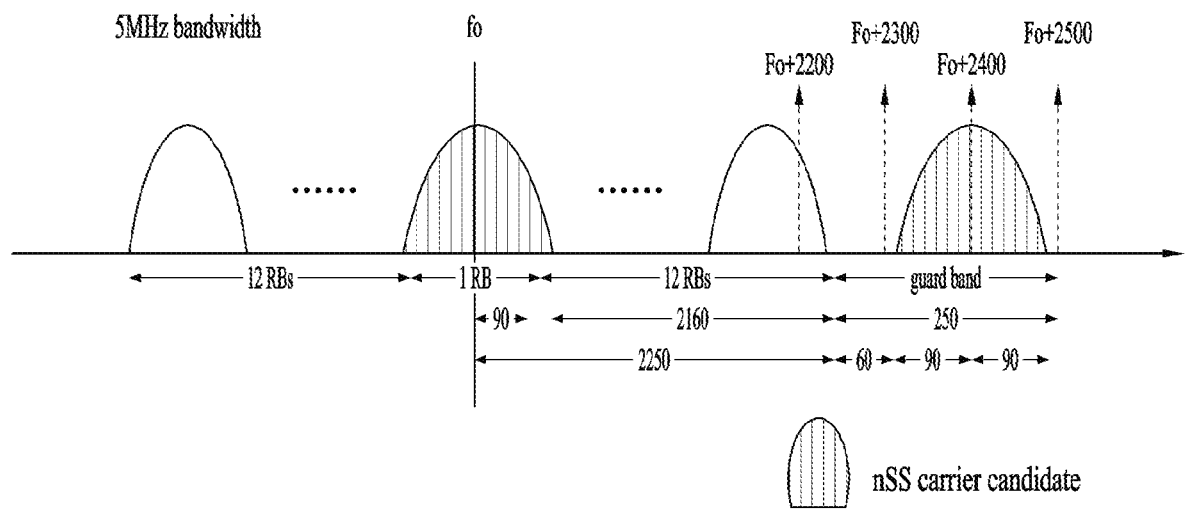
FIGS. 8 to 11 are diagrams illustrating synchronization signal carrier candidates according to the present invention.
Figure 9:
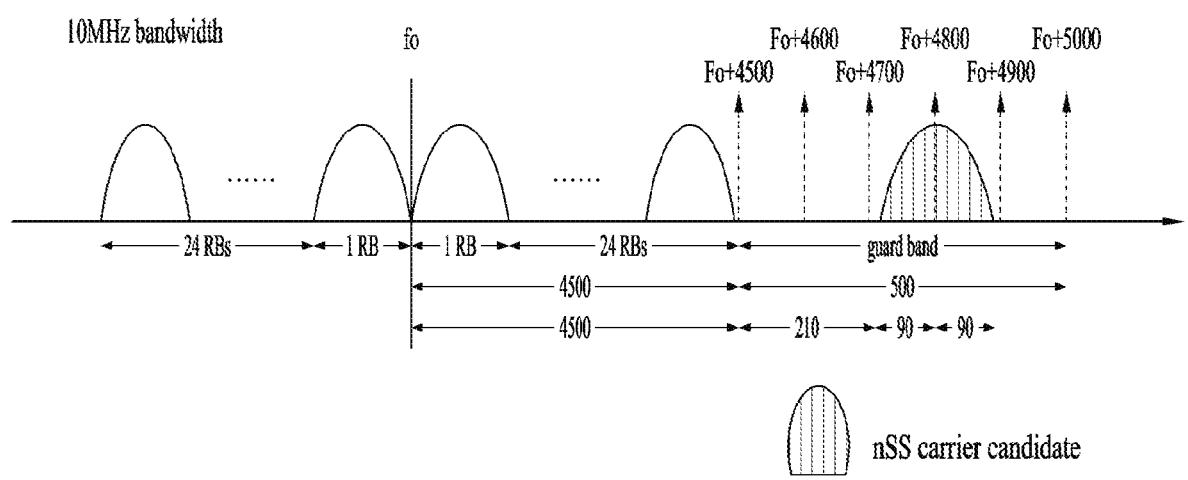
Figure 10:
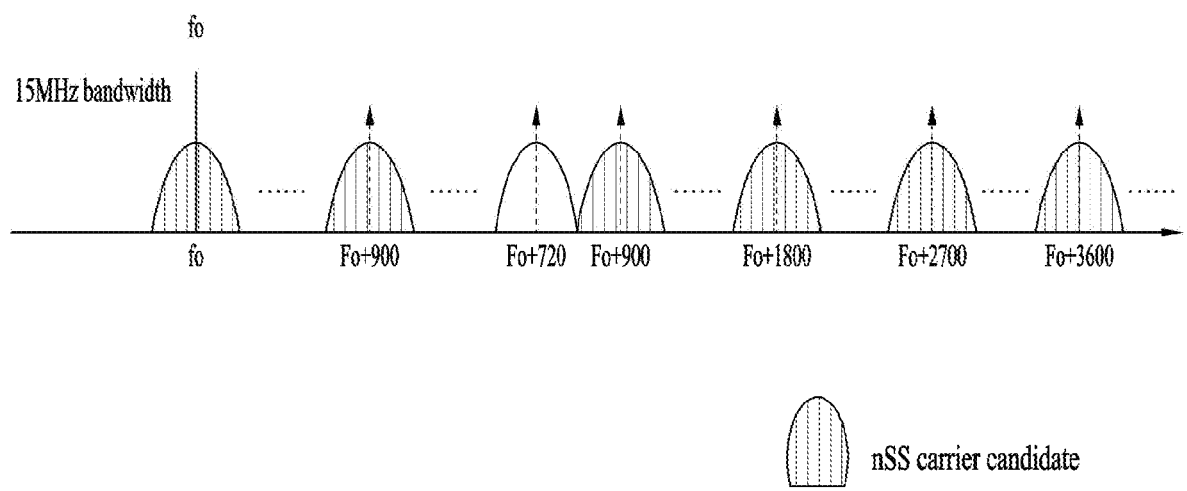
Figure 11:
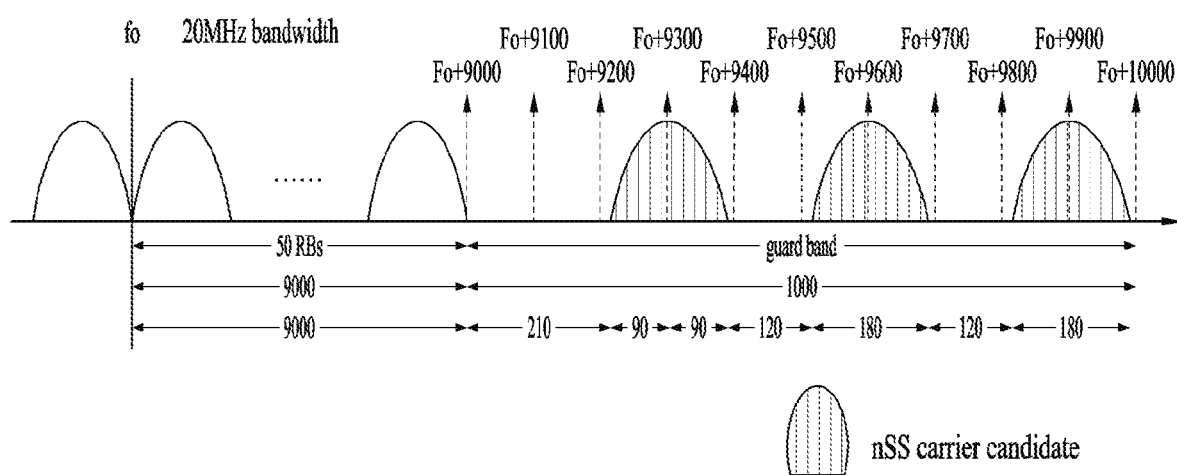

FIGS. 8 to 11 illustrate anchor carrier candidates according to an LTE channel BW. Particularly, FIG. 8 illustrates the location of an anchor carrier candidate on which an nSS may be present in an LTE band of 5 MHz, FIG. 9 illustrates the location of an anchor carrier candidate on which an nSS may be present in an LTE band of 10 MHz, FIG. 10 illustrates the location of an anchor carrier candidate on which an nSS may be present in an LTE band of 15 MHz, and FIG. 11 illustrates the location of an anchor carrier candidate on which an nSS may be present in an LTE band of 20 MHz. Referring to FIGS. 8 to 11, the nSS may be transmitted only at frequency location(s) represented as nSS carrier candidates.

A band consisting of odd-numbered RBs such as 5 MHz or 15 MHz includes a center frequency of an anchor carrier at a location of a multiple of 900 kHz from a center frequency thereof.

Referring to FIG. 8, a band of 180 MHz satisfying a channel raster of 100 kHz and a subcarrier spacing of 15 kHz in a band of 5 MHz is limited, as illustrated in FIG. 8, to a total of 3 locations including one center RB of 5 MHz and two RBs, each of which is included in a guard band located at each of both edges of a band of 5 MHz. Similarly, referring to FIG. 10, in a band of 15 MHz, a total of 11 PRBs may correspond to anchor carrier candidates.

In an LTE band of a specific size, in particular, in a system having an LTE channel BW consisting of even-numbered RBs, it is difficult to discover a PRB, which matches PRB mapping of a legacy system within an in-band and is capable of transmitting an nSS satisfying a channel raster of 100 kHz while maintaining a subcarrier spacing of 15 kHz. For example, referring to FIG. 9, in a band of 10 MHz, a total of two PRBs may correspond to anchor carrier candidates. Referring to FIG. 11, in a band of 20 MHz, a total of 6 PRBs may correspond to anchor carrier candidates. If there are few anchor subcarrier candidates as described above, it may be considered that an nSS of NB-LTE is transmitted over 2 PRBs of a legacy carrier. However, such a configuration has a shortcoming of using more RBs than necessary. If the nSS is transmitted in-band, since an eNB should also support another legacy UE at the same time, a degree to which the eNB can apply power boosting to the nSS may be restricted and a limited power should be assumed to transmit the nSS. Such a situation may result in latency and degradation of cell detection capability when an NB-LTE UE performs initial cell acquisition. To improve the above situation, the present invention proposes transmitting the nSS in a guard band even when NB-IoT is served in-band. For example, an anchor carrier on which the nSS is transmitted and a data carrier used to transmit/receive data after initial access may be separately operated. In this case, in some embodiment(s) of the present invention, "data" in "data carrier" may collectively indicate control information and system information after synchronization as well as a data channel such as a PDSCH/PUSCH.

FIG. 12 illustrates the status and transition of a UE according to the present invention.

An anchor carrier transmits basic system information for NB-LTE UE's performing initial access on an anchor carrier (S901) and information about a carrier on which channels other than an nSS/nPBCH are transmitted, i.e., information about a data carrier. According to an embodiment of the present invention, the anchor carrier may be used to transmit the nSS/nPBCH but the data carrier is not used to transmit the nSS/nPBCH.

Referring to FIG. 11, the NB-LTE UE may monitor an RF thereof according to the anchor carrier (S901) and, when necessary, monitor the RF according to the data carrier (S903).

Over the nPBCH dedicated to transmission of system information, system information of the anchor carrier and system information of the data carrier may be transmitted. For example, the system information of the anchor carrier may include the number of antenna ports, a cell ID, and/or a system frame number (SFN) on the anchor carrier. The system information of the data carrier will be described later. Information about the data carrier transmitted on the anchor carrier may be transmitted over the nPBCH. Alternatively, instead of transferring the information about the data carrier over the nPBCH, an additional channel may be set to carry the information about the data carrier.

The NB-LTE UE receives an nSS on an initial anchor carrier to adjust synchronization with the eNB, acquires system information about the initial anchor carrier using the nPBCH, receives the information about the data carrier, and then goes to the data carrier (T902) to transmit/receive data and a control channel. The anchor carrier basically provides information about the location of the data carrier as the information about the data carrier.

A relationship between the anchor carrier and the data carrier may include the following cases (but does not exclude the other cases).

Anchor carrier within guard band+same power amplifier (PA)—data carrier within in-band: When the same PA is used for the anchor carrier and the data carrier, it may be assumed that the cell ID, the SFN, etc. are shared between the anchor carrier and the data carrier and it may be assumed that time/frequency tracking values are equal. That is, when the same PA is used for the anchor carrier and the data carrier, the same cell ID and the same SFN are used for the anchor carrier and the data carrier. If frequency spacing between the in-band and the guard band are not wide, it may be assumed that the time/frequency tracking values are equal. The data carrier in the in-band may have a cell ID and/or an SFN of LTE.

Anchor carrier within guard band+different PA–data carrier within in-band: If different PAs are used for the anchor carrier and the data carrier, cell IDs, SFNs, etc. in the anchor carrier and the data carrier may be different. If different PAs are used for the anchor carrier and the data carrier, a cell ID and an SFN of the data carrier may be transmitted on the anchor carrier. The data carrier in the in-band may have a cell ID and/or an SFN of LTE and the anchor carrier in the guard band may have a cell ID and/or an SFN different from the cell ID and/or the SFN of LTE. If frequency spacing between the in-band and the guard band are not wide, it may be assumed that the time/frequency tracking values are equal. If the frequency spacing between the in-band and the guard band are wide, it may be desirable that tracking values of the data carrier and the anchor carrier be different. In this case, since time/frequency tracking for the data carrier needs to be newly performed, an offset value for a frame/subframe index in which an nSS of the data carrier is transmitted may be transmitted through the anchor carrier. Information about a difference in transmission power between the anchor carrier and the data carrier or a value of transmission power of the data carrier may also be transmitted through the anchor carrier.

Anchor carrier within guard band+data carrier within guard band: In this case, the same PA or different PAs may be assumed. To distinguish between the case in which the same PA is used and the case in which different PAs are used, information as to whether the NB-LTE UE may assume the same PA (or the same cell ID, the same SFN, etc.) may be additionally transmitted.

Anchor carrier within in-band+data carrier within guard band: If it is desired to use a guard band and an in-band which are adjacent, the eNB may configure the anchor carrier in the in-band and inform NB-LTE UEs of a frequency offset of a carrier of the guard band.

Anchor carrier within in-band+data carrier within in-band: In this case, the same PA or different PAs may be assumed. To distinguish between the case in which the same PA is used and the case in which different PAs are used, information as to whether the NB-LTE UE may assume the same PA (or the same cell ID, the same SFN, etc.) may be additionally transmitted.

In particular, if the anchor carrier is operated in the guard band, an NB-LTE system may be operated in the in-band and the guard band, regardless of an LTE system bandwidth. In the guard band or a band other than an LTE system band, since there is no restriction on physical signals (e.g., a PDCCH region, a PSS/SSS, a PBCH resource, etc.) of the LTE system, collision between an NB-IoT signal and the physical signals of the LTE system may not be considered. For example, if the anchor carrier is configured in the guard band and the data carrier is configured to operate in a PRB except for 6 center PRBs in which the PSS/SSS and the PBCH are occupied, the eNB may provide a data service to the NB-LTE UE on the data carrier without considering collision between the PSS/SSS/PBCH and the nSS and the NB-LTE UE may transmit/receive data thereof on the data carrier without considering the presence of the PSS/SSS/ PBCH.

The NB-LTE UE may acquire information about the data carrier after forming association by accessing one anchor carrier or acquire the information about the data carrier through system information of the anchor carrier. For example, the information about the data carrier may be represented as a list of frequencies of the data carrier. The location of the data carrier may be represented as a gap between a center frequency of the anchor carrier and a center frequency of the data carrier. There may be one or more data carriers. In this case, information necessary for communication on a corresponding data carrier for each data carrier may be transmitted. For example, information about data carrier(s) may be transmitted in the form of Data_carrier={nData_carrier_1, nData_carrier_2, nData_carrier_3, . . . } and information necessary to receive data and other channels for each data carrier may be transmitted. The eNB may configure a plurality of DL carriers and a plurality of UL carriers. One data carrier may consist of one UL carrier and one DL carrier. For example, the eNB may transmit data carrier information including information indicating a data DL carrier (nData_downlink_carrier) for NB-IoT and information indicating a data UL carrier (nData_uplink_carrier) for NB-IoT (e.g., Data_Data_carrier_1={nData_downlink_carrier_1, nData_uplink_carrier_1}). If a plurality of data carriers is configured, a UL carrier and a DL carrier may be separately configured. For example, information of Data_Carrier={nData_downlink_carrier_1, nData_downlink_carrier_2, nData_downlink_carrier_3, nData_uplink_carrier_1, nData_uplink_carrier_2}) may be transmitted by the eNB.

Accordingly, synchronization and basic information may be transmitted through a frequency matching channel raster and a list of frequencies for an additional NB-LTE carrier may be provided. Therefore, an NB-LTE carrier having a center frequency in a frequency which does not match a channel raster of 100 kHz may be configured.

Upon configuring a UL carrier, the eNB may indicate an additional UL carrier for transmission of a random access channel for NB-IoT (hereinafter, nRACH). If no signaling is given, the NB-LTE UE may transmit all configured UL carrier nRACHs.

Hereinafter, a method of receiving DL channel(s) by the NB-IoT UE on the anchor carrier will be described.

When a plurality of data carriers are configured, since the NB-LTE UE is generally implemented with low-cost/low-complexity, the plural data carriers are not simultaneously monitored and only one data carrier at a time may be sequentially monitored. In this case, the NB-LTE UE may move to each data carrier at an interval indicated by the eNB or a predetermined time interval to receive a channel such as data etc. Information about an interval at which the NB-LTE UE can monitor the data carrier may be provided when information about the data carrier is provided through the anchor carrier. As another method, the eNB may transmit a transition command from a corresponding data carrier, in which a channel such as an nPDSCH/nPDCCH is transmitted, to another data carrier. For example, if the NB-LTE UE is receiving the nPDCCH/nPDSCH in nData_Carrier_1, the eNB may command the NB-LTE UE to move to nData_carrier_2 in the nPDSCH at a specific timing. This process may be implicitly performed through frequency hopping between multiple data carriers. In this case, the eNB may transmit a list of carriers (i.e., a list of PRBs) on which frequency hopping is to be performed.

The NB-LTE UE first searches for the anchor carrier to receive the nSS and succeeds in performing initial access by successfully receiving the nSS/nPBCH. Upon succeeding in receiving the nSS on a carrier, the NB-LTE UE may acquire a cell ID used for signal transmission/reception on the carrier from the nSS. Upon successfully performing initial access, the NB-LTE UE may perform an operation of receiving a channel such as data after moving to the data carrier indicated by the anchor carrier. Information about the data carrier transmitted on the anchor carrier may include the location of the data carrier, for example, a gap between a center frequency of the anchor carrier and a center frequency of the data carrier, PDSCH rate-matching information of the data carrier, CRS information on the data carrier, a CP type (e.g., a normal CP or an extended CP), a frame structure type (e.g., TDD or FDD), a PDSCH start symbol number, information about an SFN, TDD UL/DL configuration (refer to Table 1) in the case of TDD, and/or a subcarrier spacing. The PDSCH rate-matching information on the data carrier may include information about a CRS location as the most representative example. For example, "a PDSCH is rate-matched at a CRS location" may indicate that a PDSCH signal is not mapped to REs on which the CRS is present. Hereinafter, "a CRS is rate-matched" indicates that the eNB does not map other DL signals (e.g., an nPDCCH and/or nPDSCH) to frequency-time resource(s) on which the CRS is mapped and indicates that the UE receives or decodes corresponding data under that assumption that other DL signals are not mapped to the frequency-time resource(s) on which the CRS is mapped. That is, unlike a puncturing operation for mapping a signal and transmitting the signal at parts except for a part of being mapped to a corresponding frequency-time resource, no data signal is mapped to a rate-matched frequency-time resource. Accordingly, a frequency-time resource punctured in a resource mapping process of a signal is counted as a resource of the signal but a signal part mapped to a punctured frequency-time resource is not actually transmitted. On the other hand, a rate-matched frequency-time resource is not counted as a resource of the signal. Accordingly, since a PDSCH signal is rate-matched on REs on which the CRS is present, the eNB does not use RE(s) used for CRS transmission to transmit the nPDCCH/nPDSCH and the UE may assume that the RE(s) assumed to be used for CRS transmission are not used to transmit the nPDCCH/nPDSCH. Information about the number of CRS antenna ports and a CRS frequency location (i.e., frequency shift $v_{shift}$) on the data carrier should be transmitted. The information corresponding to the frequency shift $v_{shift}$ may be a frequency shift $v_{shift}$ represented as one value among 0, 1, and 2 or cell ID information used to generate a CRS sequence. In addition, transmission mode (TM) information used in a broadband LTE system on the data carrier and information such as a CSI-RS may be signaled as the information about the data carrier. Information about a CSI-RS location that the NB-LTE UE should rate-match on the data carrier may also be provided.

For convenience of an operation of the NB-IoT system, a CP type, a frame structure, TDD UL/DL configuration, and subcarrier spacing information, on the data carrier, may be configured to be the same as those on the anchor carrier. In this case, the NB-LTE UE may assume that the CP type, the frame structure, the TDD UL/DL configuration, and the subcarrier spacing information, on the data carrier, are the same as those on the anchor carrier. If the CP type, the frame structure, the TDD UL/DL configuration, and the subcarrier spacing information, on the data carrier, are defined to be the same as those on the anchor carrier, such information may not be additionally signaled.

It may be assumed that an SFN in the LTE system is aligned with an SFN in the NB-LTE system. That is, it may be assumed that the SFN on the data carrier is equal to the SFN on the anchor carrier. If the SFN on the data carrier is not equal to the SFN on the anchor carrier, a difference between the SFN of the anchor carrier and the SFN of the data carrier may be signaled.

FIG. 13 illustrates a relationship between a (legacy) CRS and an in-band IoT carrier according to the present invention.

The following descriptions may be considered in the above-described embodiments of the present invention.

A multi-PRB operation permits a UE to change from an anchor carrier to an additional carrier, i.e., a non-anchor carrier, or from the non-anchor carrier to the anchor carrier. For example, the UE operating in multiple PRBs may change a carrier that the UE monitors from an anchor carrier within an in-band to an additional carrier within a guard band, from an anchor carrier within the guard band to an additional carrier within the in-band, from the anchor carrier within the guard band to an additional carrier within the guard band, or from the anchor carrier within the in-band to the additional carrier within the in-band. If the UE changes a carrier from the in-band to the guard band, it may be only necessary to indicate that an additional PRB is present within the guard band. If the UE changes a carrier to another carrier within the in-band, it is necessary to clarify how to indicate in-band specific parameters among the following parameters. The eNB needs to inform the UE of information about a cell ID of a PRB within the in-band and information about a CRS. For simplicity, information about whether a cell ID of an in-band PRB is equal to that of a PRB within the guard band or the in-band may be provided. For example, when the UE transitions from an anchor PRB to an in-band PRB, if a cell ID of the in-band PRB is equal to a cell ID of the anchor PRB, the UE may derive the frequency shift $v_{shift}$ based on frequency information (e.g., a PRB index, an offset from a center frequency, etc.) and the cell ID. Conversely, if they are not equal, the cell ID of the in-band PRB and locations of CRS ports needed by the UE to perform data rate matching may be provided from the anchor PRB (i.e., anchor carrier). As can be appreciated from FIG. 5, Equation 9, and Equation 10, since the locations of CRS ports, i.e., locations of REs on which the CRS is mapped, become different according to the number of CRS ports and the cell ID, information about the number of CRS ports and the cell ID applied to the CRS may be provided as rate-matching information. In addition, in order to receive a PDSCH within the in-band, the UE requires information about a start location of DL data (e.g., a PDSCH) in a corresponding PRB within the in-band and information about the number of OFDM symbols for a DL control channel. For example, the following information may be provided.

Same physical cell identity (PCI) (or information as to whether a cell ID of a PRB in the in-band is equal to that of an anchor PRB) (S1310)
>When a same PCI field indicates True (S1310, TRUE),
>>>If this field indicates True, it is assumed that a cell ID obtained from the anchor carrier is the same as a host cell ID within an additional PRB in the in-band, which is similar to the case of the in-band. In this case, the host cell ID may mean an LTE cell having a PRB in which an NB-IoT cell operates, i.e., an EUTRA cell.
>>If this field indicates True, it may be assumed that the same number of antenna port(s) as the number of antenna port(s) used for an RS for NB-IoT (hereinafter, an NB-RS or an NRS) within an anchor PRB (hereinafter, NRS ports) is used to transmit a legacy CRS (S1330). For example, when there are two NRS ports, the UE may receive data in a corresponding PRB under the assumption that CRSs are present at locations obtained by applying $v_{shift}$ to locations of REs represented as CRS port 0 and CRS port 1 in FIG. 5.
>>Further, if this field indicates True, the UE may assume that information of the NRS within the anchor PRB is the same as information of a CRS of a host cell. The meaning of "information of the NRS is the same as information of a CRS of a host cell" may indicate that the number of antenna ports of the NRS is the same as the number of antenna ports of the CRS and an RE location at which the NRS is transmitted is the same as an RE location at which the CRS is transmitted. In addition, the UE may receive a control signal and data under the assumption that the CRS is an NRS in a corresponding in-band. In this case, upon receiving data in a corresponding PRB, the UE may rate-match a CRS RE location and use the CRS to receive/demodulate the control signal and the data.
>>>If frequency information is given by an offset from the center, CRS PRB information may be implicitly derived from additional PRB frequency information.
>When the same PCI field does not indicate True (S1310, FALSE),
>>If this field does not indicate True, it is necessary to clarify whether the UE can still assume the same $v_{shift}$ value based on a cell ID searched for from the anchor PRB. To reduce signaling overhead, the same $v_{shift}$ value is assumed and only the number of CRS antenna ports (hereinafter, CRS ports) may be indicated (S1350). The UE may assume that CRS ports corresponding to the number of indicated CRS ports are used for CRS transmission in a corresponding PRB and receive data (S1350). For example, if the number of indicated CRS ports is 4, the UE may assume that CRSs are present at locations obtained by applying $v_{shift}$ to RE locations represented as CRS ports 0 to 3 in FIG. 5 and receive data in the PRB. If the number of CRS antenna ports is not signaled, the UE may assume that a maximum number of CRS ports (e.g., 4 ports) is used to rate-match data.

Control format indicator (CFI) (or a start location of a PDSCH or an nPDCCH is indicated).
>To cause the UE to receive a control channel (e.g., nPDCCH) and a data channel (e.g., nPDSCH) within a data PRB of the UE, information about a symbol duration in which the nPDCCH is transmitted and information about a symbol location at which nPDSCH transmission is started may be signaled to the UE.

Alternatively, instead of signaling LTE CRS information within the data PRB in association with a cell ID as described above, a legacy CRS may not be used any more in an additional PRB and the number of CRS antenna ports may be configured for the UE only to perform data rate matching. That is, the UE may decode or demodulate the nPDSCH/nPDCCH based on only the NRS without using the CRS, wherein the UE may receive, decode, or demodulate the nPDSCH/nPDCCH under the assumption that the nPDSCH/nPDCCH is not mapped to RE(s) on which the CRS is present. In this case, the UE may assume that $v_{shift}$ of the NRS which has been acquired from an anchor carrier and has already been known to the UE is equal to $v_{shift}$ of the CRS in the additional PRB. That is, the UE decodes or demodulates the nPDSCH/nPDCCH based on only the NRS without using the CRS, wherein the UE may receive, decode, or demodulate the nPDSCH/nPDCCH under the assumption that the nPDSCH/nPDCCH is not mapped on RE(s) on which the CRS is present.

As proposed above, offloading from the anchor carrier to the data carrier may be performed using one of the following methods.

Method 1. This method provides a list of potential data carrier(s) through additional system information and permits the UE to search for another carrier (in the list).

Method 2. Explicit offloading. This method explicitly configures hopping to the data carrier after cell association.

Method 3. In this method, the anchor carrier provides only system information necessary to locate an nSS and data carrier(s). In this case, the UE cannot form cell association with the anchor carrier and the anchor carrier may be assumed to be a carrier simply giving only information about the data carrier.

If the anchor carrier is used only for synchronization according to Method 3, SSs may be successively transmitted to cause the UE to rapidly detect the SSs. That is, an SS transmission scheme of the data carrier may be different from an SS transmission scheme of the anchor carrier. In this case, if the UE does not succeed in performing blind detection of an SS according to the SS transmission scheme of the anchor carrier, the UE may perform blind detection for an SS on the data carrier according to the SS transmission scheme of the data carrier.

Alternatively, if it is assumed that Method 3 is used, the UE may detect the nSS under the assumption that a CRS or a legacy PDCCH region is not present in a subframe in which the nSS may generally be present. A system desired to support IoT in an in-band may mandate SS transmission through a guard band. On the premise that the nSS is always transmitted in the guard band, a subcarrier spacing for SS transmission may differ from a subcarrier spacing in the in-band. In other words, the subcarrier spacing in which the nSS is transmitted may differ from a subcarrier spacing of the in-band. On the premise that the nSS is always transmitted in the guard band, a subcarrier spacing for SS transmission may differ from a subcarrier spacing in the in-band. In other words, a subcarrier spacing in which the nSS is transmitted may differ from a subcarrier spacing of the in-band.

In addition, if the nSS is transmitted in the guard band to support the in-band according to embodiment(s) of the present invention, the nSS may not be present in the in-band and the nSS may be transmitted only on the anchor carrier. That is, the UE may assume that the nSS is present only on the anchor carrier and no nSS is present on the data carrier within the in-band. In this case, the UE may assume that the transmission power of the nSS in the guard band is the same as the transmission power of data or a CRS in the in-band and that an SFN/time/frequency in the guard band is the same as that in the in-band.

If the nSS is transmitted only on the anchor carrier of the guard band, all OFDM symbols on the anchor carrier may be used to transmit the nSS and the nSS may be transmitted in multiple subframes.

In order for the NB-LTE UE to move to the data carrier and receive a channel such as data, the eNB should signal information about an RS for reception of a data channel and/or a control channel. Hereinafter, a data channel configured on the data carrier for NB-IoT will be referred to as an nPDSCH and a control channel configured on the data carrier for NB-IoT will be referred to as an nPDCCH. RSs used for the nPDSCH and the nPDCCH may broadly include a CRS and a DM-RS (i.e., UE-RS). When the CRS is used, the eNB may inform the UE of information about a cell ID used for the CRS on the data carrier. This cell ID may be the same as a cell ID used for an nSS sequence on the anchor carrier. If the cell ID used for the CRS on the data carrier is the same as the cell ID used for the nSS on the anchor carrier, the NB-LTE UE may use the CRS to receive the nPDSCH or the nPDCCH using the cell ID of the nSS when additional cell ID is not signaled. If a DM-RS is used, the eNB should inform the UE of information about a DM-RS sequence.

Upon moving to the data carrier, the NB-LTE UE may receive a channel such as an nPDCCH/nPDSCH thereof on an OFDM symbol after an OFDM symbol on which a broad band PDCCH is transmitted in a corresponding band. If a PDSCH start symbol indicated by the anchor carrier is an OFDM symbol n, the NB-LTE UE may receive the channel such as the nPDCCH/nPDSCH for the NB-LTE-UE starting from the OFDM symbol n.

While monitoring the data carrier for a predetermined time, the NB-LTE UE receiving the channel such as the nPDCCH/nPDSCH on the data carrier returns to the anchor carrier at a specific timing and monitors the anchor carrier. The NB-LTE UE may go to the anchor carrier according to a predetermined period (T904) and monitor the anchor carrier (S901). If the nSS/nPBCH is periodically transmitted, the NB-LTE UE may move to the anchor carrier to receive a corresponding channel in every duration in which the channel is transmitted. In addition, if the eNB indicates that the NB-LTE UE receiving a channel such as data on the data carrier should go to the anchor carrier to receive a specific channel, the NB-LTE UE should go to the anchor carrier. Upon waking up from a discontinuous reception (DRX) state, the NB-LTE UE may always go to the anchor carrier (T904), receive the nSS/nPBCH through the anchor carrier (S901), and then go to the data carrier (T902).

Hereinafter, in operating an NB-LTE system using two types of carriers, i.e., the anchor carrier and the data carrier, according to the present invention, system information and SS transmission schemes will be described in more detail.

The present invention has been schematically described in consideration of the nSS and the nPBCH transmitted only on the anchor carrier. An embodiment different from the embodiment in which the nSS and nPBCH are present only on the anchor carrier may be considered. Only an MIB may be transmitted on the anchor carrier and an nSS for partial system update may be transmitted through an additional channel of the data carrier. Moreover, an additional nSS may be transmitted on the data carrier. In this case, the nSS transmitted on the data carrier may be less frequently transmitted and may be an SS used only for the purpose of synchronization reacquisition. The nSS transmitted on the data carrier may be the same as the nSS transmitted on the anchor carrier. However, to raise the efficiency of resource usage, the nSS transmitted on the data carrier may be designed differently from the nSS transmitted on anchor carrier. For example, the nSS transmitted on the anchor carrier may be transmitted separately as two signals of an nPSS and an nSSS and the nSS transmitted on the data carrier may be transmitted only as either the nPSS or the nSSS. Alternatively, an additional signal used only for reacquisition may be transmitted on the data carrier.

If the nSS and system information are transmitted even on the data carrier, initial cell search is performed only on the anchor carrier and the NB-LTE UE which has successfully performed initial access after cell search does not need to move to the anchor carrier any longer. That is, a carrier carrying a (relatively frequently transmitted) nSS and an nPBCH for initial cell search is configured and an nSS for system information update and reacquisition except for initial cell search, and other data may be transmitted on an additional carrier.

The anchor carrier and the data carrier may be differently operated according to the type of a signal/channel transmitted/received on each carrier. Hereinbelow, the above-described basic scheme in which the nSS and the nPBCH are transmitted on the anchor carrier and signals/channels other than the nSS/nPBCH are transmitted on the data carrier will be modified and the modified scheme will be applied to a legacy LTE system band. A frequency band usable in an NB-LTE system according to the present invention is categorized into three bands, i.e., an in-band used by a legacy LTE system, a guard band of the LTE system, and a band (e.g., GSM band) which can be operated regardless of the LTE system in an additional frequency band other than a band used in the LTE system. As described above, it may be impossible, in an in-band of a specific LTE system band, to search for a band location of 180 kHz satisfying a subcarrier spacing of 15 kHz and a raster of 100 kHz for initial cell access. Obviously, an NB-IoT cell location in the in-band of the LTE system band may be easily searched according to an LTE system band. To consistently perform initial cell search regardless of the system band, the present invention has proposed operating the anchor carrier and the data carrier. However, if there are many lists of data carriers, it may be difficult to operate the anchor carrier and the data carrier. For example, if the data carrier(s) which can be used by the NB-LTE UE which has performed initial access in the anchor carrier are indicated by the nPBCH, the nPBCH needs to carry master system information (e.g., MIB) of the anchor carrier and (master) system information of the data carrier(s). In this case, it may be difficult to transmit both the system information of the anchor carrier and the system information of the data carrier(s) through the nPBCH. In addition, a subcarrier spacing used on the anchor carrier may be different from a subcarrier spacing used on the data carrier. For convenience and consistency of system design, the anchor carrier may operate as a stand-alone carrier in a guard band or in a band other than the LTE system band. Accordingly, only information about an nPSS/nSSS and master system information for performing only initial access may be transmitted on the anchor carrier and only a frequency location of the data carrier may be indicated as information about the data carrier so that the amount of system information provided through the anchor carrier can be minimized. The NB-LTE UE which has received such information and succeeded in performing initial access may move to a signaled data carrier and receive data on the data carrier. When there are plural data carriers, only a specific number of data carriers (e.g., a specific number of DL carriers and/or a specific number of UL carriers) among the plural data carriers may be indicated by the anchor carrier. System information about a plurality of actual data carriers is provided through corresponding data carriers. For example, a plurality of data carriers may be configured for the NB-LTE system. Thereamong, information such as an nSS for reacquisition and system information for the data carriers may be transmitted on some data carriers and control/data channels may be transmitted on the other data carriers. In other words, initial cell access may be performed on the anchor carrier and data carrier(s) may be divided into an IoT carrier on which system information about the data carriers and an nSS transmitted with low density are transmitted and data carriers on which the data channel and the control channel are transmitted. Since the IoT carrier is located in an in-band of the LTE system although the IoT carrier performs a partial synchronization function, there may be a restriction on locations of available REs and available symbols for minimizing interference to the LTE system. In contrast, since the anchor carrier may be located in a guard band and other bands, a degree of freedom is further raised for the usage of frequency and time resources. System information and rate-matching information of the IoT carrier and the data carrier may be the same. The IoT carrier and the data carrier become different according to whether system information through a corresponding carrier is transmitted and whether an nSS is transmitted. When the anchor carrier indicates the data carrier on which the UE should move for a data service after initial access, only information about the IoT carrier and basic system information for the IoT carrier are transmitted and the NB-LTE UE which has moved to the IoT carrier may receive system information about the data carrier and information such as a rate-matching pattern through a specific channel on the IoT carrier. Upon waking up from DRX, the NB-LTE UE may not move to the anchor carrier, may perform reacquisition, and may move to a specific data carrier after receiving system information about the data carrier.

Figure 14:
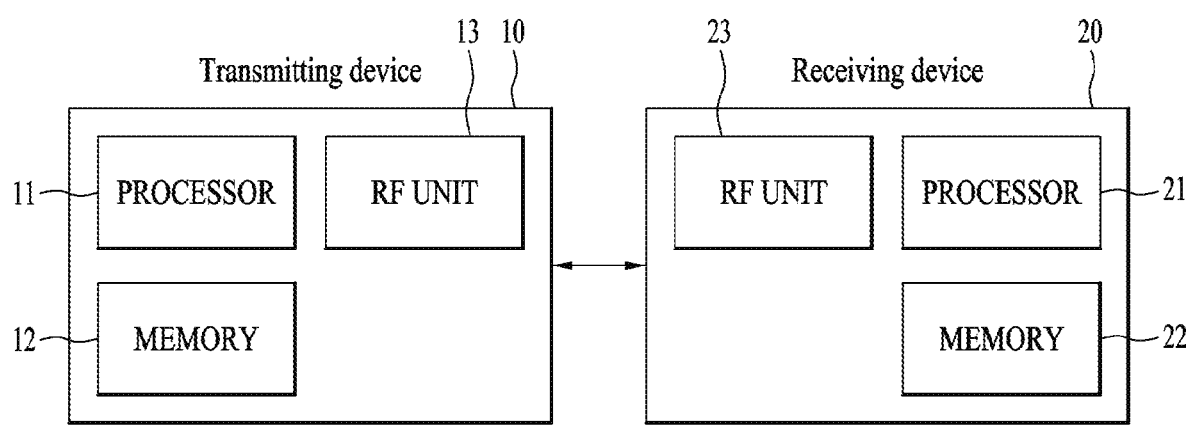
FIG. 14 is a block diagram illustrating elements of a transmitting device 10 and a receiving device 20 for implementing the present invention.

FIG. 14 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor of the present invention may control the eNB RF unit to transmit an nSS/nPBCH on an anchor carrier according to any one of the proposals of the present invention. The eNB processor may control the eNB RF unit to transmit information about data carrier(s) (hereinafter, data carrier information) which is to be used to transmit/receive a data/control channel for a specific UE on the anchor carrier. The eNB processor may control the eNB RF unit to transmit a DL control/data channel (e.g., an nPDCCH and/or an nPDSCH) to the UE on any one of the data carrier(s). The eNB processor may control the eNB RF unit to receive a UL control/data channel (e.g., an nPUCCH and/or an nPUSCH) from the UE on any one of the data carrier(s).

The UE processor of the present invention may control the UE RF unit to attempt to receive the nSS/nPBCH on anchor carriers each having a channel bandwidth of one RB or may attempt to decode the nSS/nPBCH according to any one of the proposals of the present invention. Upon succeeding in receiving or decoding the nSS/nPBCH, the UE processor may control the UE RF unit to receive data carrier information about a data carrier which is to be used to transmit/receive a control/data channel of the UE on a corresponding anchor carrier. The UE processor may control the UE RF unit to receive the DL control/data channel (e.g., the nPDCCH and/or the nPDSCH) on any one of data carrier(s) based on the data carrier information. The UE processor may control the UE RF unit to transmit the UL control/data channel (e.g., the nPUCCH and/or the nPUSCH) on any one of data carrier(s) based on the data carrier information.

The eNB processor of the present invention may control the eNB RF unit to transmit information about a cell ID (hereinafter, a first cell ID) of an NB-IoT carrier according to any one of the proposals of the present invention. The eNB processor may control the eNB RF unit to transmit the DL signal (e.g., the nPDCCH and/or the nPDSCH) on the NB-IoT carrier. The NB-IoT carrier may be, for example, a carrier operating in one PRB within a channel band of an LTE system. In this case, processing of a CRS transmitted in an LTE cell may be problematic. If the NB-IoT carrier operates in an in-band PRB, the eNB processor may control the eNB RF unit to transmit cell ID information indicating whether a cell ID (hereinafter, a second cell ID) used for a (legacy) CRS on the NB-IoT carrier is the same as or different from the first cell ID.

If the second cell ID is the same as the first cell ID, the eNB processor may control the eNB RF unit to transmit the CRS on the NB-IoT carrier through the same number of antenna ports as the number of antenna ports (hereinafter, the NRS ports) used for transmission of an.

If the second cell ID is different from the first cell ID, the eNB processor may control the eNB RF unit to transmit number-of-CRS ports information indicating the number of antenna ports (hereinafter, CRS ports) used for transmission of the CRS. The number of CRS ports and the number of NRS ports may be equal or different. However, if the second cell ID and the first cell ID are different, since this means that a cell ID used for transmission of the CRS is different from a cell ID used for transmission of the NRS, a CRS resource location for rate-matching may be different according to a cell ID even when the number of CRS ports is the same as the number of NRS ports. Accordingly, if the second cell ID is different from the first cell ID, the eNB processor according to the present invention may control the eNB RF unit to transmit the information indicating the number of CRS ports to the UE. The eNB processor may control the eNB RF unit to transmit the CRS on the NB-IoT carrier through CRS ports of a number corresponding to the number-of-CRS ports information.

Upon transmitting the CRS on the NB-IoT carrier, the eNB processor may control the eNB RF unit to transmit the CRS at a frequency location (refer to Equation 9 and Equation 10) obtained by applying a frequency shift $v_{shift}$ based on the second cell ID. The eNB processor may generate the NRS based on the second cell ID and control the eNB RF unit to transmit the NRS on the NB-IoT carrier.

The eNB processor may control the eNB RF unit to transmit carrier information about the NB-IoT carrier (hereinafter, a data carrier) on a different NB-IoT carrier (hereinafter, an anchor carrier) from the NB-IoT carrier. The carrier information may include information indicating a cell ID of the data carrier. For example, the cell ID may be (implicitly) transmitted through an nSS transmitted on the anchor carrier. In other words, the cell ID transmitted on the anchor carrier may be applied to the data carrier. The data carrier may be a carrier without the nSS/nPBCH and the anchor carrier may be a carrier with the nSS/nPBCH. The anchor carrier may be a carrier operating in a PRB within a guard band of the channel band used in the LTE system.

The UE processor of the present invention may control the UE RF unit to receive the information about the cell ID (hereinafter, the first cell ID) of the NB-IoT carrier according to any one of the proposals of the present invention. The UE processor may control the UE RF unit to receive the DL signal (e.g., the nPDCCH and/or the nPDSCH) on the NB-IoT carrier. The NB-IoT carrier may be, for example, a carrier operating in one PRB within the channel band of the LTE system. In this case, processing of the CRS transmitted in the LTE cell may be problematic. If the NB-IoT carrier operates in an in-band PRB, the UE RF unit may receive the cell ID information indicating whether the cell ID (hereinafter, the second cell ID) used for the (legacy) CRS on the NB-IoT carrier is the same as or different from the first cell ID.

If the second cell ID is the same as the first cell ID, the UE processor may control the UE RF unit to receive the DL signal on the NB-IoT carrier under the assumption that the CRS is transmitted on the NB-IoT carrier through the same number of antenna ports as the number of antenna ports (hereinafter, the NRS ports) used for transmission of an NRS. For example, if the number of NRS ports is 2, the UE processor may rate-match a corresponding CRS resource location under the assumption that the CRS is transmitted from CRS ports 0 and 2. In other words, if the number of NRS ports is 2, the UE processor may assume that the CRS is transmitted from CRS ports 0 and 2 and receive or decode the DL signal under the assumption that there is no corresponding DL signal (e.g., the nPDCCH and/or the nPDSCH) mapped to a corresponding CRS resource location.

If the second cell ID is different from the first cell ID, the UE RF unit may receive the number-of-CRS ports information indicating the number of antenna ports (hereinafter, CRS ports) used for transmission of the CRS. The UE processor may control the UE RF unit to receive the DL signal (e.g., the nPDCCH and/or the nPDSCH) on the NB-IoT carrier under the assumption that the CRS is transmitted from CRS ports of a number corresponding to the number-of-CRS ports information.

Upon receiving the CRS on the NB-IoT carrier, the UE processor may control the UE RF unit to receive the DL signal (e.g., the nPDCCH and/or the nPDSCH) on the NB-IoT carrier under the assumption that the CRS is transmitted at a frequency location (refer to Equation 9 and Equation 10) obtained by applying the frequency shift $v_{shift}$ based on the second cell ID. The UE processor may control the UE RF unit to receive the NRS based on the second cell ID.

The UE processor may acquire the carrier information about the NB-IoT carrier (hereinafter, the data carrier) on a different NB-IoT carrier (hereinafter, an anchor carrier) from the NB-IoT carrier. The carrier information may include information indicating a cell ID of the data carrier. For example, the cell ID may be acquired through the nSS received on the anchor carrier. The UE processor may apply the cell ID acquired on the anchor carrier to the data carrier. The data carrier may be a carrier without the nSS/nPBCH and the anchor carrier may be a carrier with the nSS/nPBCH. The anchor carrier may be a carrier operating in one PRB within the guard band of the channel band used in the LTE system.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method of receiving a downlink signal in narrowband Internet of things (NB-IoT) by a user equipment in a wireless communication system, the method comprising:
acquiring a first cell identifier from a first carrier;
receiving carrier information regarding a second carrier different from the first carrier on the first carrier; and
receiving downlink data for the user equipment on a downlink carrier of the second carrier based on the carrier information,
wherein the first carrier operates in one first resource block (RB) within a guard band used in the wireless communication system and the second carrier operates in one second RB within a channel band used in the wireless communication system,
wherein the first carrier is a carrier on which an NB-IoT synchronization signal (nSS) and an NB-IoT physical broadcast channel (nPBCH) are received and the second carrier is a carrier on which the nSS and the nPBCH are not received,
wherein the second carrier comprises the downlink carrier and an uplink carrier, and the carrier information includes information regarding the downlink carrier and information regarding the uplink carrier,
wherein the downlink data is received on the downlink carrier of the second carrier based on a narrowband reference signal (NB-RS),
wherein the NB-RS is received based on the first cell identifier,
wherein the carrier information further includes cell identifier information regarding whether a second cell identifier used for a cell specific reference signal (CRS) on the second carrier is the same as the first cell identifier,
wherein in a state in which the cell identifier information indicates that the second cell identifier used for the CRS is the same as the first cell identifier, the number of antenna ports for the CRS is the same as the number of antenna ports for the NB-RS, and wherein in a state in which the cell identifier information indicates that the second cell identifier used for the CRS is different from the first cell identifier, the carrier information further includes antenna port information regarding the number of antenna ports for the CRS and the number of antenna ports for the CRS is the same as the number of antenna ports corresponding to the antenna port information.

2. The method according to claim 1,
wherein the wireless communication system is a long term evolution (LTE) system.

3. A method of transmitting a downlink signal in narrowband Internet of things (NB-IoT) to a user equipment by a base station in a wireless communication system, the method comprising:
transmitting a first cell identifier through a first carrier;
transmitting carrier information regarding a second carrier different from the first carrier on the first carrier; and
transmitting downlink data for the user equipment on a downlink carrier of the second carrier based on the carrier information,
wherein the first carrier operates in one first resource block (RB) within a guard band used in the wireless communication system and the second carrier operates in one second RB within a channel band used in the wireless communication system,
wherein the first carrier is a carrier on which an NB-IoT synchronization signal (nSS) and an NB-IoT physical broadcast channel (nPBCH) are transmitted and the second carrier is a carrier on which the nSS and the nPBCH are not transmitted,
wherein the second carrier comprises the downlink carrier and an uplink carrier, and the carrier information includes information regarding the downlink carrier and information regarding the uplink carrier,
wherein the downlink data is transmitted on the downlink carrier of the second carrier based on a narrowband reference signal (NB-RS),
wherein the NB-RS is transmitted based on the first cell identifier,
wherein the carrier information further includes cell identifier information regarding whether a second cell identifier used for a cell specific reference signal (CRS) on the second carrier is the same as the first cell identifier,
wherein in a state in which the cell identifier information indicates that the second cell identifier used for the CRS is the same as the first cell identifier, the number of antenna ports for the CRS is the same as the number of antenna ports for the NB-RS, and
wherein in a state in which the cell identifier information indicates that the second cell identifier used for the CRS is different from the first cell identifier, the carrier information further includes antenna port information regarding the number of antenna ports for the CRS and the number of antenna ports for the CRS is the same as the number of antenna ports corresponding to the antenna port information.

4. The method according to claim 3,
wherein the wireless communication system is a long term evolution (LTE) system.

5. A user equipment for receiving a downlink signal in narrowband Internet of things (NB-IoT) in a wireless communication system, the user equipment comprising,
a receiver,
a processor, and
a computer memory that is operably connectable to the processor and that has stored thereon instructions which, when executed, cause the processor to perform operations comprising:
receiving, via the receiver, a first cell identifier from a first carrier;
receiving, via the receiver, carrier information regarding a second carrier different from the first carrier on the first carrier; and
receiving, via the receiver, downlink data for the user equipment on a downlink carrier of the second carrier based on the carrier information,
wherein the first carrier operates in one first resource block (RB) within a guard band used in the wireless communication system and the second carrier operates in one second RB within a channel band used in the wireless communication system,
wherein the first carrier is a carrier on which an NB-IoT synchronization signal (nSS) and an NB-IoT physical broadcast channel (nPBCH) are received and the second carrier is a carrier on which the nSS and the nPBCH are not received,
wherein the second carrier comprises the downlink carrier and an uplink carrier, and the carrier information includes information regarding the downlink carrier and information regarding the uplink carrier,
wherein the downlink data is received on the downlink carrier of the second carrier based on a narrowband reference signal (NB-RS),
wherein the NB-RS is received based on the first cell identifier,
wherein the carrier information further includes cell identifier information regarding whether a second cell identifier used for a cell specific reference signal (CRS) on the second carrier is the same as the first cell identifier,
wherein in a state in which the cell identifier information indicates that the second cell identifier used for the CRS is the same as the first cell identifier, the number of antenna ports for the CRS is the same as the number of antenna ports for the NB-RS, and
wherein in a state in which the cell identifier information indicates that the second cell identifier used for the CRS is different from the first cell identifier, the carrier information further includes antenna port information regarding the number of antenna ports for the CRS and the number of antenna ports for the CRS is the same as the number of antenna ports corresponding to the antenna port information.

6. The user equipment according to claim 5,
wherein the wireless communication system is a long term evolution (LTE) system.

7. A base station for transmitting a downlink signal in narrowband Internet of things (NB-IoT) to a user equipment by a base station in a wireless communication system, the base station comprising,
a transmitter,
a processor, and
a computer memory that is operably connectable to the processor and that has stored thereon instructions which, when executed, cause the processor to perform operations comprising:

transmitting, via the transmitter, a first cell identifier from a first carrier;

transmitting, via the transmitter, carrier information regarding a second carrier different from the first carrier on the first carrier; and transmitting, via the transmitter, downlink data for the user equipment on a downlink carrier of the second carrier based on the carrier information, wherein the first carrier operates in one first resource block (RB) within a guard band used in the wireless communication system and the second carrier operates in one second RB within a channel band used in the wireless communication system, wherein the first carrier is a carrier on which an NB-IoT synchronization signal (nSS) and an NB-IoT physical broadcast channel (nPBCH) are transmitted and the second carrier is a carrier on which the nSS and the nPBCH are not transmitted, wherein the second carrier comprises the downlink carrier and an uplink carrier, and the carrier information includes information regarding the downlink carrier and information regarding the uplink carrier, wherein the downlink data is transmitted on the downlink carrier of the second carrier based on a narrowband reference signal (NB-RS), wherein the NB-RS is transmitted based on the first cell identifier, wherein the carrier information further includes cell identifier information regarding whether a second cell identifier used for a cell specific reference signal (CRS) on the second carrier is the same as the first cell identifier, wherein in a state in which the cell identifier information indicates that the second cell identifier used for the CRS is the same as the first cell identifier, the number of antenna ports for the CRS is the same as the number of antenna ports for the NB-RS, and wherein in a state in which the cell identifier information indicates that the second cell identifier used for the CRS is different from the first cell identifier, the carrier information further includes antenna port information regarding the number of antenna ports for the CRS and the number of antenna ports for the CRS is the same as the number of antenna ports corresponding to the antenna port information.

8. The base station according to claim 7, wherein the wireless communication system is a long term evolution (LTE) system.

* * * * *